(12) United States Patent
Bent et al.

(10) Patent No.: US 10,497,061 B1
(45) Date of Patent: Dec. 3, 2019

(54) SYSTEMS AND METHODS FOR PROVIDING LOAN MANAGEMENT FROM CASH OR DEFERRED INCOME ARRANGEMENTS

(71) Applicant: Access Control Advantage, Inc., Manhasset, NY (US)

(72) Inventors: Bruce Bent, Manhasset, NY (US); Bruce Bent, II, Manhasset, NY (US)

(73) Assignee: Access Control Advantage, Inc., Manhasset, NV (US)

( * ) Notice: Subject to any disclaimer, the term of this patent is extended or adjusted under 35 U.S.C. 154(b) by 215 days.

(21) Appl. No.: 14/095,556

(22) Filed: Dec. 3, 2013

Related U.S. Application Data

(63) Continuation of application No. 11/928,826, filed on Oct. 30, 2007, now Pat. No. 8,626,649.

(60) Provisional application No. 60/957,090, filed on Aug. 21, 2007.

(51) Int. Cl.
    *G06Q 40/06* (2012.01)
    *G06Q 40/02* (2012.01)

(52) U.S. Cl.
    CPC ........... *G06Q 40/06* (2013.01); *G06Q 40/025* (2013.01)

(58) Field of Classification Search
    CPC .............................. G06Q 20/10; G06Q 40/00
    USPC .......................................................... 705/39
    See application file for complete search history.

(56) References Cited

U.S. PATENT DOCUMENTS

| 4,114,027 A | 9/1978 | Slater et al. |
| 4,194,242 A | 3/1980 | Robbins |
| 4,346,442 A | 8/1982 | Musmanno |
| 4,718,009 A | 1/1988 | Cuervo |
| 4,739,478 A | 4/1988 | Roberts et al. |
| 4,742,457 A | 5/1988 | Leon et al. |
| 4,750,121 A | 6/1988 | Halley et al. |
| 4,910,676 A | 3/1990 | Alldredge |
| 4,969,094 A | 11/1990 | Halley et al. |
| 5,025,138 A | 6/1991 | Cuervo |
| 5,083,270 A | 1/1992 | Gross et al. |

(Continued)

FOREIGN PATENT DOCUMENTS

WO    WO-00/49543    8/2000

OTHER PUBLICATIONS

U.S. Appl. No. 09/495,647, Vernaglia.

(Continued)

*Primary Examiner* — Peter Ludwig
*Assistant Examiner* — Michael D Cranford
(74) *Attorney, Agent, or Firm* — Amster, Rothstein & Ebenstein LLP

(57) ABSTRACT

The method comprising: administering a first plurality of loan fund accounts; maintaining an association of each different one of the first plurality of loan fund accounts with a different investment vehicle that is part of the respective benefit plan account; receiving a selection from a selecting entity of one or more loan fund accounts from among the first plurality of loan fund accounts; investing loan fund assets comprising participant assets associated with the selecting entity in the different investment vehicles associated with loan fund accounts; associating a respective loan accounting process with each of the selected loan fund accounts; receiving a loan-request; initiating transfer of an amount requested; and updating account information to reflect said loan-request funds transferred from said loan fund account.

28 Claims, 11 Drawing Sheets

(56) References Cited

U.S. PATENT DOCUMENTS

| | | | |
|---|---|---|---|
| 5,193,057 | A | 3/1993 | Longfield |
| 5,206,803 | A | 4/1993 | Vitagliano et al. |
| 5,214,579 | A | 5/1993 | Wolfberg et al. |
| 5,323,315 | A | 6/1994 | Highbloom |
| 5,631,828 | A | 5/1997 | Hagan |
| 5,689,100 | A | 11/1997 | Carrithers et al. |
| 5,724,523 | A | 3/1998 | Longfield |
| 5,745,885 | A | 4/1998 | Mottola et al. |
| 5,754,980 | A | 5/1998 | Anderson et al. |
| 5,787,404 | A | 7/1998 | Fernandez-Holmann |
| 5,809,484 | A | 9/1998 | Mottola et al. |
| 5,852,811 | A | 12/1998 | Atkins |
| 5,878,405 | A * | 3/1999 | Grant et al. .................. 705/39 |
| 5,884,285 | A | 3/1999 | Atkins |
| 5,933,815 | A | 8/1999 | Golden |
| 5,933,817 | A | 8/1999 | Hucal |
| 5,950,179 | A | 9/1999 | Buchanan et al. |
| 5,991,745 | A | 11/1999 | Kiritz |
| 6,016,482 | A | 1/2000 | Molinari et al. |
| 6,018,723 | A | 1/2000 | Siegel et al. |
| 6,052,673 | A | 4/2000 | Leon et al. |
| 6,105,007 | A | 8/2000 | Norris |
| 6,112,188 | A | 8/2000 | Hartnett |
| 6,122,625 | A | 9/2000 | Rosen |
| 6,148,293 | A | 11/2000 | King |
| 6,208,978 | B1 | 3/2001 | Walker et al. |
| 6,625,582 | B2 | 9/2003 | Richman et al. |
| 6,950,807 | B2 | 9/2005 | Brock |
| 7,302,413 | B1 | 11/2007 | Bent et al. |
| 7,324,970 | B2 | 1/2008 | Magruder et al. |
| 7,398,245 | B1 | 7/2008 | Bent et al. |
| 7,647,239 | B2 | 1/2010 | MacDonald |
| 8,626,649 | B1 | 1/2014 | Bent |
| 2002/0013751 | A1 | 1/2002 | Facciani et al. |
| 2002/0023051 | A1 | 2/2002 | Kunzle et al. |
| 2002/0035530 | A1 | 3/2002 | Ervolini et al. |
| 2002/0052836 | A1 | 5/2002 | Galperin et al. |
| 2002/0062249 | A1 | 5/2002 | Iannacci |
| 2002/0198825 | A1 | 12/2002 | Jentoft |
| 2003/0004866 | A1 | 1/2003 | Huennekens et al. |
| 2003/0126072 | A1 | 7/2003 | Brock |
| 2003/0135448 | A1 | 7/2003 | Aguias et al. |
| 2003/0144934 | A1 | 7/2003 | Totten |
| 2003/0149656 | A1 | 8/2003 | Magruder et al. |
| 2003/0208438 | A1 | 11/2003 | Rothman |
| 2004/0054613 | A1 | 3/2004 | Dokken |
| 2004/0098329 | A1 | 5/2004 | Tilton |
| 2004/0138972 | A1 | 7/2004 | Mendelsohn |
| 2004/0153388 | A1 | 8/2004 | Fisher et al. |
| 2005/0065871 | A1 | 3/2005 | Gerhart et al. |
| 2005/0097033 | A1 | 5/2005 | Pretell et al. |
| 2006/0015421 | A1 | 1/2006 | Grimberg |
| 2006/0031158 | A1 | 2/2006 | Orman |
| 2006/0031159 | A1 | 2/2006 | Minot et al. |
| 2006/0224480 | A1 | 10/2006 | Bent et al. |
| 2006/0271465 | A1 | 11/2006 | McNamar et al. |
| 2006/0282356 | A1 | 12/2006 | Andres et al. |
| 2007/0011083 | A1 | 1/2007 | Bird et al. |
| 2008/0082459 | A1 | 4/2008 | Bowser |
| 2008/0294555 | A1 | 11/2008 | Bromma |
| 2010/0241584 | A1 | 9/2010 | Kirkman et al. |
| 2011/0016061 | A1 * | 1/2011 | Mercier et al. ............. 705/36 R |

OTHER PUBLICATIONS

"Reserve Financial" trademark file history for U.S. Appl. No. 78/008759, filed Oct. 17, 2001.
"Reserve Financial" trademark file history for U.S. Appl. No. 78/090,844, filed Oct. 30, 2001.
"Reserve Solutions" trademark file history for U.S. Appl. No. 78/444,650, filed Jul. 1, 2004.
"Reserveplus" trademark file history for U.S. Appl. No. 77/507,403, filed Jun. 25, 2008.
"Reserveplus" trademark file history for U.S. Appl. No. 78/445,264, filed Jul. 2, 2004.
Altieri, Mark P.; "Nonqualified Deferred Compensation Plans"; The CPA Journal;[online] Retrieved on Jun. 12, 2012 from the Internet: <URL: http://www.nysscpa.org/cpajournal/2005/205/essentials/p54.htm; pp. 1-12.
*Benefit Funding Systems LLC et al.* v. *U.S. Bancorp*, Complaint; Civil Action No. 1-12-cv-00803; Jun. 22, 2012; pp. 1-4.
Borleis et al., "Loan Administration in 401K Plans," Benefits Quaterly, vol. 11, No. 2, pp. 67-75, (Second Quarter 1995).
TM file for Reserve Advantage Applications from PTO, U.S. Appl. No. 78/444,717, Word Mark: ReserveAdvantage Program, 11 Sheets.
TM file for Reserve Advantage Applications from PTO, U.S. Appl. No. 78/559,556, Word Mark: ReserveAdvantage Program, 20 Sheets.
Declaration of Mr. Bruce Bent II, Vice Chairman and Registrant of Applicant. (3 Sheets) and Exhibits A, B, C and D; Feb. 27, 2007 (6 Sheets).
Downs et al., "Dictionary of Finance and Investment Terms," Fifth Ed., Barron's Educational Series, Series, p. 136.
Exhibit A: 1913 Webster's Revised Unabridged Dictionary; definition of Novation; 1 page.
Hardy, David, et al.; Anti-avoidance provisions; International Tax Review, London, Jul./Aug. 1994; 8 pages.
Harney, Kenneth R.; Home Asset Management Accounts Link Mortgages, Equity Lines; The Washington Post, Oct. 5, 2002; p. H.06
Iezman, Stanley L.; "Operating Pension Funds in Compliance with ERISA Procedures: How to Avoid a Department of Labor Audit: A Premier for Lawyers," webpage, 1999-00.
JP Morgan Chase Bank; "Non-qualified Deferred Compensation Plan";[online] Retrieved on Jun. 11, 2012 from the Internet: <URL: https://www.chase.com/index.jsp?pg_name=ccpmapp/smallbusiness/retiring_investing/ . . . ; pp. 1-2.
McGuire Kara: Minnesotans getting hit by Wall Street Woe: Assets frozen after the Reserve Primary Fund "broke the buck" are still in legal limbo; 2012; MCT Information Svc; 14/AA,AN,AZ,AU, TI/2 (Item 2 from file: 608).
Menkhoff, Lukas, et al.; Collateral-based lending in emerging markets: Evidence from Thailand; Journal of Banking & Finance 30 (2006); www.sciencedirect.com; available online Mar. 17, 2005; pp. 1-21.
Mirer, T.W., "The Optimal Time to File for Social Security Benefits", Public Finance Review, Nov. 1998, pp. 611-636, vol. 26, No. 6.
Novack, Janet; How to Tap Retirement Funds Penalty-Free; Forbes; Apr. 7, 2009; 2 pages.
Postlewaite, Susan; Medina Deeds $1 Million Home to Lender to Settle 1st of 2 Suits; Miami Review, Oct. 9, 1992, Sec. C. p. 1.
Reimers et al., "Response to Social Security by Men and Women: Myopic and Far-Sighted Behavior", Journal of Human Resources, Spring 1996, p. 359(24); vol. 31, No. 2.
Reserve Financial Web Site, Reserve Solutions Inc., Innovative Financial Products, Archive org Versions of equityloancard.com, 7 Sheets, (Internet Archive Wayback Machine).
Reserve Financial Web Site, Reserve Solutions Inc., Innovative Financial Products, Archive org Versions of reservesolutions.com, 14 Sheets, (Internet Archive Wayback Machine).
Social Security Bulletin, Summer 1996, pp. 67-70, vol. 59, No. 2.
Tiaa Cref; "Section 457(b) Private Nonqualified Deferred Compensation Plans—Summary of Key Features"; , [online] Retrieved in Jun. 2012 from the Internet; 3 pages.
U.S. Office Action dated Sep. 27, 2010.
USPTO Notice of Allowance on U.S. Appl. No. 11/928,826 dated Sep. 17, 2013; 15 pages.
Walker, Tom; The Atlanta Journal-Constitution Wall Street column; 2012; MCT Information Svc 14/AA,AN/AZ,AU/TI/4 (Item 4 from file: 608).
Womack, Anita; EFT '99 spawns methods for reaching the "unbanked"; Bank Marketing v. 30 n. 6; pp. 8-11; Jun. 1998; 4 pages.
Yan, Ellen; Debit card tied to 401(k) stirs debate, legislation; 2012; MCT Information Svc; 14/AA,AN,AZ,AU,TI/3 (Item 3 from file: 608).

(56) References Cited

OTHER PUBLICATIONS

U.S. Appl. No. 14/710,291, filed May 12, 2015, Bruce Bent II.

* cited by examiner

SYSTEMS AND METHODS FOR PROVIDING LOAN MANAGEMENT FROM CASH OR DEFERRED INCOME ARRANGEMENTS

RELATED APPLICATIONS

This application is a Continuation of U.S. application Ser. No. 11/928,826, filed Oct. 30, 2007, incorporated herein by reference in its entirety, which claims priority from Provisional Application U.S. Application 60/957,090, filed Aug. 21, 2007, incorporated herein by reference in its entirety. This application further incorporates by reference all of the subject matter of U.S. application Ser. No. 10/092,279 filed on Mar. 6, 2002 and implemented in the Reserve Plus financial product by assignee prior to 2005 in its entirety and further incorporates by reference all of the subject matter of U.S. application Ser. No. 10/183,661 filed Jun. 27, 2007 in its entirety.

FIELD OF THE INVENTION

The present invention generally relates to methods for providing and managing loan programs related to pension plans including qualified benefit plans, or to employee-benefit plans, or to benefit plans generally. More particularly, this invention includes: processes for authorizing and establishing pension related loan funds; processes for repayment and redemption suitable for the wide variety of access vehicles (check, credit card, debit card, wire transfer, ACH, sweeps, etc.) that may be coupled to the loan programs; processes for discharging trustee responsibilities delegated by the related pension funds, such as proper regard for applicable laws, regulations, and plan policies; as well as processes for program loan repayment and for accounting for and reestablishment of such loan programs.

Preferably, the processes of the present invention are implemented by programmed computer systems in communication both with other financial management entities having a role in the loan programs and with the loan-program participants.

BACKGROUND OF THE INVENTION

Employee-benefit programs, including employee pension programs including qualified employee pension programs, have accumulated large amounts of assets, by 1994 exceeding $1.75 trillion. For many individuals of low and moderate income, their beneficial interests and assets in these benefit programs are their largest, or even their only, pool of capital and savings.

These assets have traditionally been set aside for and limited to retirement income purposes only, and have not been effectively available to help with the vicissitudes of life, such as higher education, purchase of a residence, temporary unemployment, unexpected medical expenses, and the like. But for those of low or moderate income, who may be the most challenged by these life events, such limitations on these most significant assets can be a problem. Thus, lower income or lower age persons have the perception that they cannot get their money out or borrow against their money efficiently.

Fortunately, statutory and regulatory developments provide possibilities for ameliorating these asset-availability problems. Specifically, they now permit benefit plans to establish policies and procedures for making temporary loans from individually-accumulated assets to their employee beneficiaries. Theoretically, anyone who needs temporarily to tap their benefit-plan assets may do so by applying to their benefit plan.

But benefit-plan administrators to date have typically adopted conventional paper-based procedures usually requiring an employee submission of a completed loan application for each separate loan, employer-plan approval of the loan application, and then employee signature of a note with fixed installment-based terms to repay the borrowing to the plan. Many plans also require participants with outstanding benefit-plan loans to repay the loans within a short period of time (usually 90 days) after termination of employment, which is frequently not convenient. For those most likely to need benefit-plan loans, this process appears time consuming at best and intrusive, unfamiliar, and intimidating at worst.

The unfortunate consequences of these traditional procedures has been, on the one hand, that individuals of low and moderate income avoid plan loans and instead rely on high interest rate credit cards for their financing needs. On the other hand, if a plan loan is used, more funds than are immediately needed are usually removed from the benefit plans, due to the difficulty of the current process and the uncertainty of a participant's financial needs at the time of loan application, which unnecessarily lowers future retirement income. In the worst case, employees eligible to participate in a retirement plan completely opt out because of the perceived lack of liquidity, thereby losing the entire matching employer contribution and the advantages inherent in qualified benefit plans.

Proposals that have been made for simplifying the benefit-plan loan process have not enjoyed any commercial success thus far, principally because they have not adequately considered the current financial record-keeping systems of employee-benefit-plan providers. These current record-keeping systems are structured to interact with employers and investment managers, not with the employees who are the beneficiaries. For example, U.S. Pat. No. 5,206,803, issued Apr. 27, 1993, describes a system for providing pension-fund-backed credit to fund beneficiaries. But that system places all the burdens of processing employee credit demands and of distributing funds on the pension plan itself.

There is clearly a need for methods and systems that simplify providing of employee-benefit-plan loans while respecting the functionality of existing benefit plans, financial mechanics, methods; and systems for providing basic retirement income and other employee-benefit services.

Citation or identification of any reference in this section or any section of this application should not be construed as indicating that the reference is available as prior art to the present invention.

SUMMARY OF THE INVENTION

The objects of the present invention are to overcome these deficiencies in the prior art by providing methods and systems that simplify the provision of employee-benefit-plan loans while efficiently interacting with the financial mechanics, methods, and systems of existing employee-benefit services. Importantly, this invention appears to and interfaces with employee-benefit plans (and to benefit plans generally) essentially as a plurality of investment vehicles to which the plan participant may direct parts of their assets; it assumes all responsibility for properly managing participant loans; and it further appears to and interfaces with a variety of access systems (check, credit card, debit card, wire transfer, ACH, sweeps, etc.) essentially as one more financial institution providing payment services in accustomed fashions.

Loan management provided by the invention is, first of all, properly provided according to the statutory and regulatory context of the jurisdiction of employers, regulators, and employee beneficiaries. Although the detailed description is primarily directed to embodiments for the United States and its territories, it is to be understood, and one of skill in the arts will so understand, that the present invention is not so limited. It also has embodiments that may be implemented in any jurisdiction providing, first, benefit plans for employees and others, in which at least a part of the plan assets are specifically allocated to individual plan participants and in which the individual plan participants have some discretion in the investment of their specifically allocated assets. Second, the jurisdiction must permit loans, or equivalent temporary disbursements, of part of the specifically allocated assets for current employee use, either general or limited. Additional embodiments may maintain explicit information concerning the jurisdictional management requirements so that such embodiments may service employers in more than one jurisdiction. The present invention will also meet any further statutory and regulatory requirements, such as privacy, information interchange, non-discrimination, and the like.

In preferred U.S. embodiments, the invention's loan-management processes preserve the plan participant's qualifications according to 26 U.S.C. § 401 et seq. (qualified pension, profit-sharing, and stock bonus plans), and more particularly according to 26 U.S.C. § 401(k) (cash or deferred arrangements). Although Section 401(k) plans are particularly preferred, the present invention may interface to other similar plans (for example, 403(b) plans, 457 plans, individual retirement accounts [IRA], Keough accounts, and the like). Further, loan funding and disbursement preferably meet the requirements of 26 U.S.C. § 72 (annuities; certain proceeds of endowment and life insurance contracts). Finally, in the U.S., the invention's loan-management processes preferably meet the reporting, fiduciary, and other requirements of 29 U.S.C. § 1001 et seq. (Employee Retirement Income Security Program) (ERISA). See, Gertner, 1994, *Everything You Always Wanted To Know About ERISA*, Investment Management Consultants Association, Denver, Colo.; Dearborn Financial Publishing, Inc., 1999, *401(k) Plans* $3^{rd}$ *Edition*, Dearborn Financial Publishing, Inc., Chicago, Ill.

Loan management is also preferably provided according to the policies and procedures that may be established by individual benefit plans. For example, a benefit plan may, by agreement, have specific policies concerning maximum loan amounts, maximum loan frequencies, maximum loan payback periods, and the like. Such specific policies may further govern employee authentication methods, data privacy, and other management processes. Accordingly, embodiments that interface with multiple benefit plans preferably maintain explicit information concerning each plan's policies and requirements so that such embodiments may service multiple plans.

Although primarily described in terms of qualified-employee-benefit plans and as loans from these plans meeting the requirements for not being deemed such distributions, in further embodiments the invention may allow participants to convert their loans into plan distributions. Further, the systems and methods of the present invention may also be advantageously employed for loan funds related to employee-benefit plans that are not qualified. In such embodiments, the invention's loan-management methods need be primarily in accordance only with the plan's agreements and procedures, because meeting statutory and regulatory requirements for qualification at all times is unnecessary.

Finally, to realize full benefit of this invention, a jurisdiction preferably should have in place electronically implemented payment systems with interfaces that permit adding systems of this invention as a financial institution providing payment services. Preferably, this invention may include interfaces to payment systems in which individuals present access vehicles to their loan-fund account for ordering the redemption of a specified sum to a specified payee. These access vehicles include checks, credit cards, debit cards, wire transfers, ACH services, sweeps, and others. See O'Mahony et al., 1997, Electronic Payment Systems, Artech House, Inc., Norwood, Mass.

More specifically, the present invention provides low-cost financing to employee beneficiaries by simplified and routine access to a portion of the assets accumulated within their established benefit plans, especially pension benefit plans. This access is on an as-needed basis, by means of a variety of possible access vehicles (check, credit card, debit card, wire transfer, ACH services, sweeps, etc.), and without cumbersome paperwork. Importantly, selected embodiments of the systems of the present invention interface efficiently to and work both with established employee-benefit-plan systems and administrations and also with established payment systems.

Methods of the present invention open, manage, and terminate a plurality of loan funds, at least one for each benefit plan participant that takes advantage of this invention. Importantly, these loan funds are managed independently of the plan by the invention. Also, since they are legally considered as employee investments, interest paid by plan participants on their outstanding loans (also called herein "redemptions") is actually accrued (less fees) to their own benefit-plan accounts, thus replacing high interest borrowing via bank cards for the participant.

The present invention further provides in one embodiment loan-management data-processing systems that interface and communicate with established benefit-plan-management systems and with established payment systems. Embodiments of the loan-management data-processing systems cooperate with these interfaced systems to open loan funds for a plan participant, provide for payment authorizations and redemptions from the loan funds, arrange funds transfers, provide repayment and status information to participants, and so forth. Thus, cumbersome paper procedures are minimized and participants can manage their loan funds according to their daily needs.

In the following, the benefit plan may be known as the "main" benefit plan to distinguish it clearly from the loan fund, especially in those alternative organization embodiments where the same financial organization may offer benefit plan services, loan fund services, or loan fund investment management services.

In one embodiment, a method is provided to be implemented at least in part by computer for facilitating provision of loans to a plurality of participants of one or more benefit plan accounts associated with one or more record keepers, each participant having participant assets in one or more of the benefit plan accounts, each of the benefit plan accounts comprising a plurality of investment vehicles, each of the one or more record keepers providing record keeping services for at least one of the benefit plan accounts, comprising: administering a first plurality of loan fund accounts, each different loan fund account being associated with a respective one or more of the benefit plan accounts, and funded by participant assets of the respective associated one or more of the benefit plan accounts, referred to as loan fund assets, wherein funds may be drawn for loans from each of the different loan fund accounts, and wherein each of the loan fund accounts maintains both assets and debts; maintaining an association of each different one of the first plurality of loan fund accounts with a different investment vehicle that is part of the respective one or more benefit plan accounts but segregated from other investment vehicles in the respective one or more benefit plan accounts; receiving a selection from a selecting entity of one or more of the loan fund accounts from among the first plurality of loan fund accounts; investing or having invested or maintaining loan fund assets comprising participant assets associated with the selecting entity in the one or more respective different investment vehicles associated with the one or more selected loan fund accounts; associating a respective loan accounting process with each of the selected one or more loan fund accounts, capable of processing multiple loan requests that are less than an asset balance in the loan fund account, wherein the loan accounting process is different from one or more accounting processes associated with the respective one or more benefit plans; receiving a loan-request comprising one or more participant loan requests to be taken from one or more of said loan fund accounts using account information for said loan fund account; initiating transfer of an amount of funds requested by said loan-request from one or more of said loan fund accounts to service the loan-request; and updating by computer said account information for said loan fund account to reflect said loan-request amount of funds transferred from said loan fund account using the associated respective accounting process that computes a current balance of available funds in the loan fund account based on redemptions from the amount of assets in the loan fund account and payments to the amount of assets in the loan fund account and does not change a loan fund asset amount listed in the account information of the benefit plan account relating to the loan fund account for each redemption.

In further embodiment, the loan request comprises an aggregation of a plurality of loan requests from participants received in a period.

In further embodiment, the selecting entity is one of the record keepers, and wherein the selected one or more loan fund accounts are funded with participant assets in one or more benefit plans for which the one record keeper provides record keeping services.

In further embodiment, the selection received from the one record keeper is for a second plurality of the loan fund accounts, and further comprising receiving a selection from one or more of the participants associated with the one record keeper of at least one of the second plurality of loan fund accounts to invest loan fund assets associated with the one or more participants.

In further embodiment, the selecting entity is a benefit plan associated with one of the benefit plan accounts, and wherein the one or more loan fund accounts are funded with participant assets from the one benefit plan account.

In further embodiment, the selection received from the benefit plan is for a second plurality of loan fund accounts, and further comprising: receiving a selection from one or more of the participants in the one benefit plan account of at least one of the second plurality of loan fund accounts to invest loan fund assets associated with the one or more participants.

In further embodiment, there are a plurality of different record keepers and a plurality of benefit plans accounts and further comprising: receiving a selection of a respective second plurality of the loan fund accounts from each respective record keeper of the plurality of different record keepers, and funding or having funded the respective second plurality of loan fund accounts selected by each different record keeper with participant assets associated with that respective record keeper.

In further embodiment, there are a plurality of different benefit plan accounts and further comprising: receiving a selection by each of the plurality of different benefit plan accounts of a respective second plurality of loan fund accounts, and funding or having funded the respective second plurality of loan fund accounts selected by each different benefit plan account with participant assets associated with that respective benefit plan account.

In further embodiment, the selecting entity is one of the participants.

In further embodiment, the selecting entity is one of the participants and further comprising: receiving from the participant a selection of at least two of the loan fund accounts to invest loan fund assets associated with the one participant.

In further embodiment, the steps are provided of receiving a selection of a second plurality of loan fund accounts, wherein there are a plurality of benefit plan accounts, and aggregating the loan fund assets associated with the plurality of benefit plan accounts among the loan fund accounts in the second plurality of loan fund accounts.

In further embodiment, the selection received is for a second plurality of loan fund accounts, and further comprising: aggregating the loan fund assets from the plurality of record keepers among the second plurality of loan fund accounts.

In further embodiment, there are a plurality of the record keepers, and further comprising: maintaining each different loan fund account with one and only one record keeper.

In further embodiment, there are a plurality of the record keepers, and further comprising: maintaining for each of the different record keepers a separate account in each of a plurality of the loan fund accounts.

In further embodiment, there are a plurality of the benefit plan accounts, and further comprising: maintaining for each of the different benefit plan accounts an associated separate account in each of a plurality of the loan fund accounts.

In yet further embodiment, a computer system is provided for facilitating provision of loans to a plurality of participants of one or more benefit plan accounts associated with one or more record keepers, each participant having participant assets in one or more of the benefit plan accounts, each of the benefit plan accounts comprising a plurality of investment vehicles, each of the one or more record keepers providing record keeping services for at least one of the benefit plan accounts, said computer system comprising: one or more processors; and one or more computer-readable memories operatively connected to one or more processors, with computer program instructions capable of performing steps comprising: administering a first plurality of loan fund accounts, each different loan fund account being associated with a respective one or more of the benefit plan accounts, and funded by participant assets of the respective associated one or more of the benefit plan accounts, referred to as loan fund assets, wherein funds may be drawn for loans from each of the different loan fund accounts, and wherein each of the loan fund accounts maintains both assets and debts; maintaining an association of each different one of the first plurality of loan fund accounts with a different investment vehicle that is part of the respective one or more benefit plan accounts but segregated from other investment vehicles in the respective one or more benefit plan accounts; receiving a selection from a selecting entity of one or more of the loan fund accounts from among the first plurality of loan fund accounts; investing or having invested or maintaining loan fund assets comprising participant assets associated with the selecting entity in the one or more respective different investment vehicles associated with the one or more selected loan fund accounts; associating a respective loan accounting process with each of the selected one or more loan fund accounts, capable of processing multiple loan requests that are less than an asset balance in the loan fund account, wherein the loan accounting process is different from one or more accounting processes associated with the respective one or more benefit plans; receiving a loan-request comprising one or more participant loan requests to be taken from one or more of said loan fund accounts using account information for said loan fund account stored in said computer-readable memory; initiating transfer of an amount of funds requested by said loan-request from one or more of said loan fund accounts to service the loan-request; and updating said account information for said loan fund account to reflect said loan-request amount of funds transferred from said loan fund account using the associated respective accounting process that computes a current balance of available funds in the loan fund account based on redemptions from the amount of assets in the loan fund account and payments to the amount of assets in the loan fund account and does not change a loan fund asset amount listed in the account information of the benefit plan account relating to the loan fund account for each redemption.

In yet further embodiment, a program product is provided comprising: a computer readable medium having encoded program data capable of, when executed, causing a computer to perform a method for facilitating provision of loans to a plurality of participants of one or more benefit plan accounts associated with one or more record keepers, each participant having participant assets in one or more of the benefit plan accounts, each of the benefit plan accounts comprising a plurality of investment vehicles, each of the one or more record keepers providing record keeping services for at least one of the benefit plan accounts, comprising the steps: administering a first plurality of loan fund accounts, each different loan fund account being associated with a respective one or more of the benefit plan accounts, and funded by participant assets of the respective associated one or more of the benefit plan accounts, referred to as loan fund assets, wherein funds may be drawn for loans from each of the different loan fund accounts, and wherein each of the loan fund accounts maintains both assets and debts; maintaining an association of each different one of the first plurality of loan fund accounts with a different investment vehicle that is part of the respective one or more benefit plan accounts but segregated from other investment vehicles in the respective one or more benefit plan accounts; receiving a selection from a selecting entity of one or more of the loan fund accounts from among the first plurality of loan fund accounts; investing or having invested or maintaining loan fund assets comprising participant assets associated with the selecting entity in the one or more respective different investment vehicles associated with the one or more selected loan fund accounts; associating a respective loan accounting process with each of the selected one or more loan fund accounts, capable of processing multiple loan requests that are less than an asset balance in the loan fund account, wherein the loan accounting process is different from one or more accounting processes associated with the respective one or more benefit plans; receiving a loan-request comprising one or more participant loan requests to be taken from one or more of said loan fund accounts using account information for said loan fund account; initiating transfer of an amount of funds requested by said loan-request from one or more of said loan fund accounts to service the loan-request; and updating by computer said account information for said loan fund account to reflect said loan-request amount of funds transferred from said loan fund account using the associated respective accounting process that computes a current balance of available funds in the loan fund account based on redemptions from the amount of assets in the loan fund account and payments to the amount of assets in the loan fund account and does not change a loan fund asset amount listed in the account information of the benefit plan account relating to the loan fund account for each redemption.

BRIEF DESCRIPTION OF THE FIGURES

The present invention may be understood more fully by reference to the following detailed description of preferred embodiments, to illustrative examples of specific embodiments, and to the appended figures in which.

DETAILED DESCRIPTION OF THE INVENTION

Figure 1:
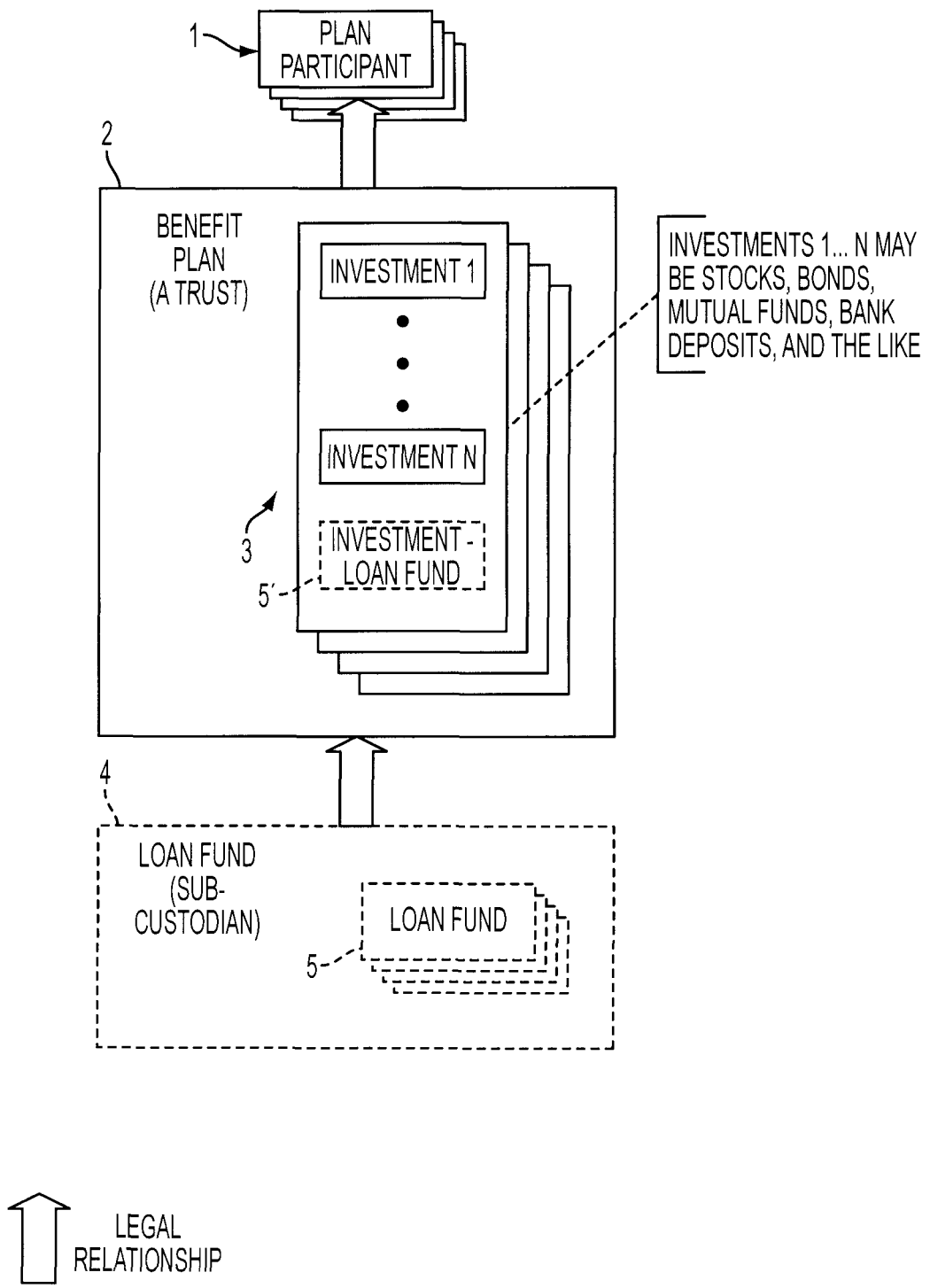
FIG. 1 illustrates a financial/legal structure used in a preferred embodiment of the present invention.

In the following, the term "participant" (or "plan participant") refers to an employee-plan beneficiary (the plan perhaps providing retirement income), or generally to a benefit-plan beneficiary. A participant may be currently employed (i.e., an "employee"), between employment, or retired. The term 'plan" refers to any employee-benefit plan meeting the expectations of the invention as described above, and includes pension plans, 401(k) plans, 403(b) plans, 457 plans, IRAs, Keough accounts, to name a few. The term "redemption" (or "loan redemption", "advance", "withdrawals", "purchase", "liquidation", etc.) refers to a participant's use of assets segregated in a loan fund established by the present invention as payment in a transaction. The term "repayment" (or "repayment by a participant") refers to a participant's loan repayment of any redemptions made through the process of the present invention.

The term "interest" (when used in the context of interest on redemptions) refers to loan interest due from or paid by participants on their redemptions (that is, their loan principal). Participants thus repay both redemptions and any interest on the redemptions.

The term "dividends" refers to earnings, if any, on balances in the participants' loan funds. Dividends are provided by the investment vehicles in which the loan funds are invested.

The term "available loan amount" (ALA) refers to the maximum amount that may be used to finance redemptions determined in view of a participant's benefit-plan assets. Typically, the ALA varies with (e.g., as a fixed percentage of) the vested benefit-plan assets.

The term "line of credit" (LOC) refers to the amount available to finance current redemptions. Typically, the LOC varies with (e.g., is equal to) the current, unredeemed funds in a participant's loan fund.

Further, the term 'access vehicle" refers generally to financial and procedural mechanisms by which an individual may access for use funds available in or through a demand deposit account, or a line of credit, or other financial instruments. Access vehicles include "traditional access vehicles," which may be, but are not limited to: checks, or electronic checks, or credit cards, or smart cards, or debit cards, or wire transfers, or ACH services, or sweeps, or automatic teller machines (ATM), to name a few. Preferred access vehicles include automatic processing mechanisms (generally networked computer systems) that can be easily interfaced to the systems of the present invention to access participants' loan funds. (As one of skill in the art will appreciate, the present invention may interface to new access vehicles which are being developed or are yet to be developed.) However, the system and accounts in embodiments of the invention are designed to be capable of processing multiple redemptions by the participant during a given period, with each of a plurality of the redemptions being for an amount that is less than the available loan amount.

Described next are the general embodiments and accompanying advantageous functional features of the present invention. Described subsequently are the legal and financial structures to which the present invention is applicable, system structures of the present invention, and lastly the methods of the present invention.

General Embodiments and Functional Features

The present invention provides "loan funds" within employee-benefit plans, similar to plans authorized (in the U.S.) by 26 U.S.C. §§ 401(k), 403(b), or 457, or similar to individual retirement accounts (IRA), or Keough accounts. These statutory plans are designed to accumulate financial assets to support, for example, participants' pension or retirement needs. Preferably, applicable plans also provide separate accounts for each individual participant, each account holding accumulated assets that are invested according to at least partial participant control in various investment vehicles and including options permitting participants to borrow assets from their plan accounts.

The "loan fund" of the present invention makes conveniently available to participants redemptions funded by a portion of the participants' accumulated benefit-plan assets. Within individual participant accounts in an applicable benefit plans, according to the present invention, "loan-fund investments" (see, e.g., 5 in FIG. 1 and its subsequent discussion) are established and invested in appropriate "loan-fund" investment vehicles. The loan-fund investment vehicles are managed by one or more investment managers, preferably already established and experienced investment managers, so that, primarily, the vehicles maintain high liquidity with substantially constant face value, and secondarily, so that the vehicle earns reasonable dividends consistent with the primary goals of the benefit plan. In the U.S., "money-market" funds may serve as appropriate loan-fund investment vehicles, although other investment vehicles with reasonable liquidity may also serve as such vehicles. Other possible investment vehicles include bank demand deposits, or certificates of deposit, or certain stocks, or bonds, or mutual funds, or so forth.

The present invention then provides administrative systems which are responsible for managing and directing the transfers of funds in and out of the participants' loan funds and for establishment and maintenance of loan funds. The value of a participant's loan-fund investment recorded in the benefit plan changes as the balance in that participant's loan fund (loan fund accounts receivable for outstanding loans to the participant plus loan funds invested in the loan fund investment vehicles) changes. The benefit-plan loan-fund-investment value further increases as interest and dividends are accrued to the benefit plan. In order that a participant can access assets from their individual loan fund, this invention's administrative systems interface, on one hand, to established payment systems (e.g., the Visa® or MASTERCARD® networks or check clearinghouse (ACH)).

On the other hand, these administrative systems interface with established benefit/pension plan management systems, which are often divided functionally and perhaps physically, into a record-keeper function (or system) and a plan-management function (or system; in the U.S., typically a trust company monitors plan assets). Specifically, the provided administrative systems are designed to interface with record-keeper functions in order to frequently (for example, daily or weekly or monthly) update the benefit plan with the current value of the participants' loan-fund investments. This interface is preferably substantially similar to the record-keepers' interface with other investment systems managing other investments present in participant accounts. The actual loan-fund administrative management function (or systems) of this invention need only interact with the existing benefit-plan administrative systems (i.e., record-keeper systems) when a participant decides to make, change, or terminate investments in the loan funds, an interaction consistent with the interactions the plan management function has with other investment-management systems.

In operation, the administrative systems of the present invention draw cash assets from a participant's loan fund to cover redemptions, and add cash assets to a loan fund when the participant repays outstanding loans (or redemptions). Therefore, cash assets remain in a participant's loan fund earning dividends, until the very moment they are lent out to the participant. The unused amounts remaining in the loan fund continue to provide dividend income to the participant's plan account, while the participant pays interest on the cash redemptions actually withdrawn from the loan fund.

Moreover, it is preferable that the administrative systems manage participants' loan funds so that amounts in the loan funds whether redeemed to the participant or still available for loan (that is "on call"), as well as interest paid on redemptions and dividend income earned on the on-call amount, continue to have the advantages of the benefit plan. Thus loan-fund assets are maintained within the benefit plan under favorable advantages by the individual participant until actually borrowed (redeemed), and upon borrowing, are replaced by loan receivables due from the participant. Thus, interest paid and redemption repayments receive similar advantages. The administrative systems of the current invention also enable participants' outstanding loans to be 'portable,' thus eliminating the need for participants to pay off outstanding loans upon employment termination. Accordingly, when information is received by the system indicating an employment termination of the participant, the system in one embodiment may record that information in its database, but does not send out a notice requiring repayment of outstanding loans.

Briefly, a participant's maximum available loan amount is typically limited by statute, regulation, and perhaps also by plan policy to a certain percentage of the vested value in the participant's benefit-plan account. The loan fund is preferably structured as a sub-custodian (or a sub-trust) (operating similarly to a self directed brokerage account) of the benefit-plan, which is often legally structured as a trust. The systems and methods of the present invention then manage processes for settlement of participant redemptions and acceptance of participant repayments so that the advantages of the benefit plan flow to the loan fund as an investment within the plan.

Accordingly, the loan funds provided by the present invention are a substantial improvement over current benefit-plan loan processes, and also are significantly more economical then traditional unsecured personal borrowing, such as bank credit card loans. Because the present invention provides loan access related to the value of the established loan fund, borrowing costs are dramatically reduced below typical bank cards. In fact, the interest paid by the participant on loans made possible by this invention (and dividends earned by the loan fund) is credited to the participant's own benefit-plan account. Neglecting expenses, loan interest paid becomes retirement savings. Further, because the present invention increases the accessibility and liquidity of participant assets saved in benefit plans, increased participation in and contribution to benefit plans are likely.

In other words, the present invention enables the participant to maintain the funds within the loan fund investment vehicle until the moment needed. The interest charged the participant for the financing redemptions benefits the participant, therefore creating an alternative form of daily transactional financing that reduces the overall cost of funding needs of the participant and enables substantial cost savings over traditional credit card financing, especially, but not exclusively, for low to middle income plan participants that do not have access to alternative low cost forms of credit (i.e. home equity financing).

In addition to these financial advantages, the structure of the administrative systems of the present invention provides additional and significant process and procedural advantages. As described, the administrative systems separate routine (often, daily) use of a participant's cash resources (or cash-equivalent or other liquid assets) in their loan fund from those exchanges and transfers supporting a participants longer term decisions (typically, monthly or even yearly) on asset allocation within the overall benefit plan account, including the size of loan fund to make available for redemptions from the participant's benefit-plan account.

Advantageously, the invention interfaces high frequency (for example, daily or even hourly) exchanges and transfers only to established payment systems, which are designed to handle high-volume, standardized transactions. It limits exchanges and transfers with benefit-plan systems to those of lower frequency (for example, monthly or yearly), which result from participant investment decisions. Established benefit-plan systems (specifically, record-keeping systems) are already designed to handle these lower-frequency investment-decision driven transactions.

Some embodiment of this structure allow the invention to provide the loan funds in the context of established and functioning financial systems while requiring, at most, minimal modifications to these existing systems. From the point of view of these existing system, little impediment to implementation of the loan funds of the present invention is apparent. Additionally, benefit-plan processing costs for managing this invention's loan fund are reduced in comparison to existing loan plans, because implementation of this invention does not substantially burden the processing already performed by current benefit-plan systems, the type of processing for which they have been designed. These cost savings may be passed on to a plan sponsor (such as an employer) and could be an incentive for the adoption of the present invention, ultimately increasing participation in benefit plans.

Further, the administrative systems preferably provide for participants' enhanced access, for example, by means of the phone or Internet and standard web browsers, for rapidly creating loan plans, for funding of and repayments to their loan plans, and for reporting on their balances and transaction, availability and status information, electronic checking and payment, and the like. This allows participants the privileges and benefits of traditional access vehicles along with real-time tracking and accessing of information via phone or Internet.

In more detail, the administrative systems of the present invention include one or more data-processing systems mutually interconnected. This system processes programs that establish and maintain loan funds so that regulatory funding, redemptions, repayments, and interest-rate criteria (on outstanding redemptions) are met to support qualified loan based transactions. These data-processing systems monitor a plurality of loan-fund accounts, each associated with a single participant's plan, preferably for multiple employers, and perhaps, even for multiple jurisdictions. The system monitors and determines funding criteria for each participant based on the available line of credit (LOC) value derived from the loan-fund asset composition. The funding criteria are applied to the access vehicles and are used to support redemptions made to the respective plan participants. These loans (redemptions) are thereafter charged an interest rate based on market factors. The system handles the redemption process and the repayment process within the loan-fund system per established regulatory requirements, and importantly, without burdening established benefit-plan systems with a new type of frequent transaction.

Specifically, the legal relationship of the loan funds to the benefit plan is preferably that of a sub-custodian to the benefit-plan trust. In other embodiments, this relationship may be that of a sub-trustee, may be contractual, and so forth.

DETAILED EMBODIMENTS

Described here are legal structures of the invention; described subsequently are system and methods of the invention.

Legal Structures of the Invention

FIG. 1 illustrates a preferred organizational and legal structure for the invention. The ultimate beneficiaries of the invention, and of the associated benefit plan, are a plurality of (at least one) participants 1. Benefit plan 2 has a legally-recognized responsibility to the participants to properly manage their assets and benefits, and includes a plurality of (at least one) accounts 3, for each participant beneficiary 1. Each account 3 includes at least one investment, and in the majority of instances, a plurality of investments, typically 2-5, of which the composition and asset allocation is at least partially directed by its associated participant beneficiary.

In U.S. embodiments, the benefit plan is usually structured as a legal trust, which stands in a fiduciary relationship to the participants.

A plurality of loan funds 4 are added to the benefit-plan structure. The benefit plan has responsibility for a plurality of loan funds 5, one loan fund for each participant who has chosen to participate in this invention. The elements added by this invention are indicated in FIG. 1 by dashed outlines. The loan fund has a legal relationship to benefit plan 2 which maintains the correct administration of the loan funds according to statutory and regulatory requirements and according to plan policies and procedures (e.g., plan loan policies, privacy policies, and the like). Generally, a participant taking advantage of this invention directs the benefit plan to transfer a part of their assets into the loan fund, so that from the point of view of the benefit plan, a participant's loan fund appears as an investment by the participant. Preferably, dividend income generated by the loan fund is accrued as investment income to the participant's benefit-plan account.

Benefit-Plan and Payment-System Structures

Figure 2A:
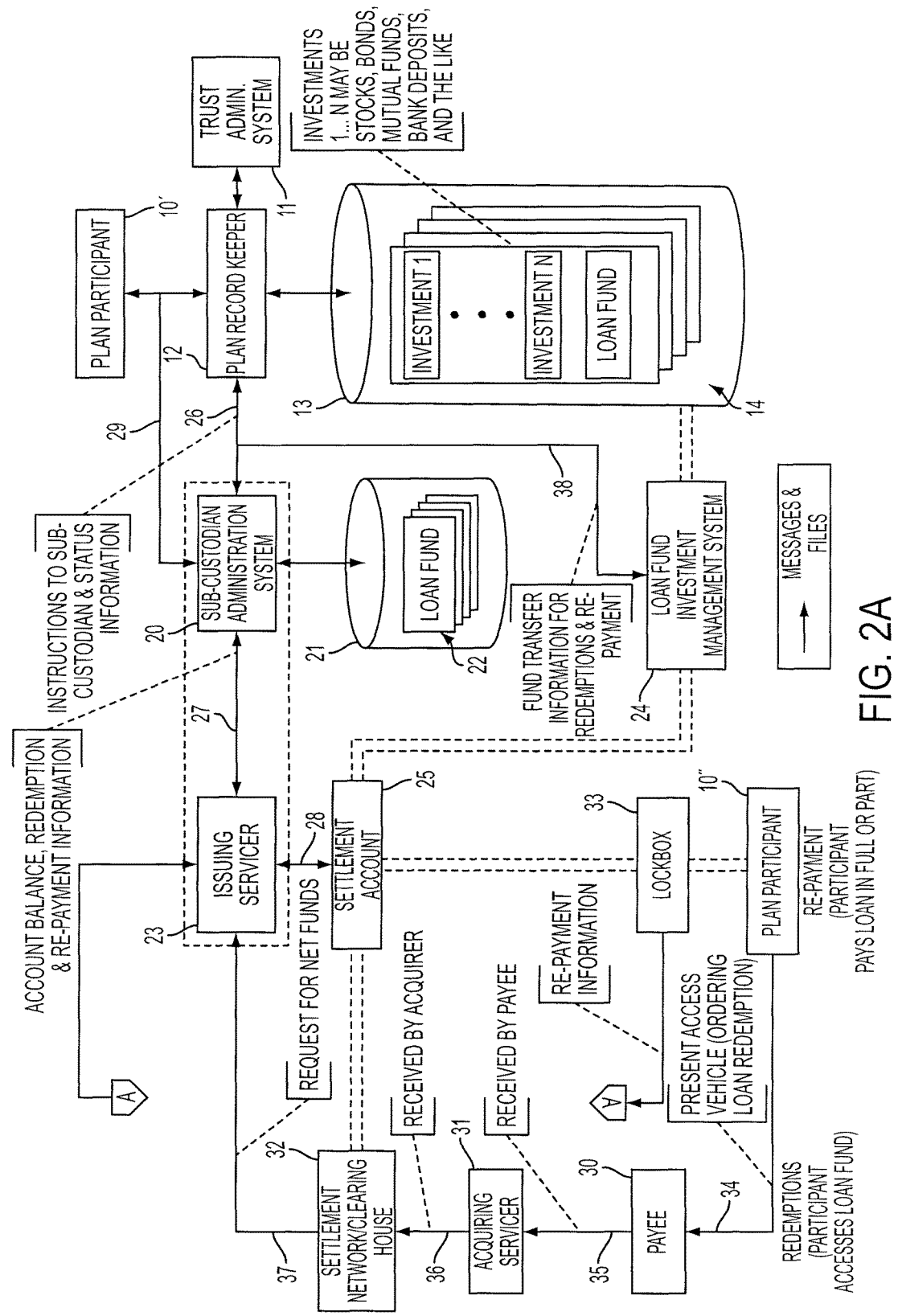
FIGS. 2A-B illustrate a system structure of a preferred embodiment of the present invention along with the information and monetary exchanges within the illustrated structure.
Figure 2B:
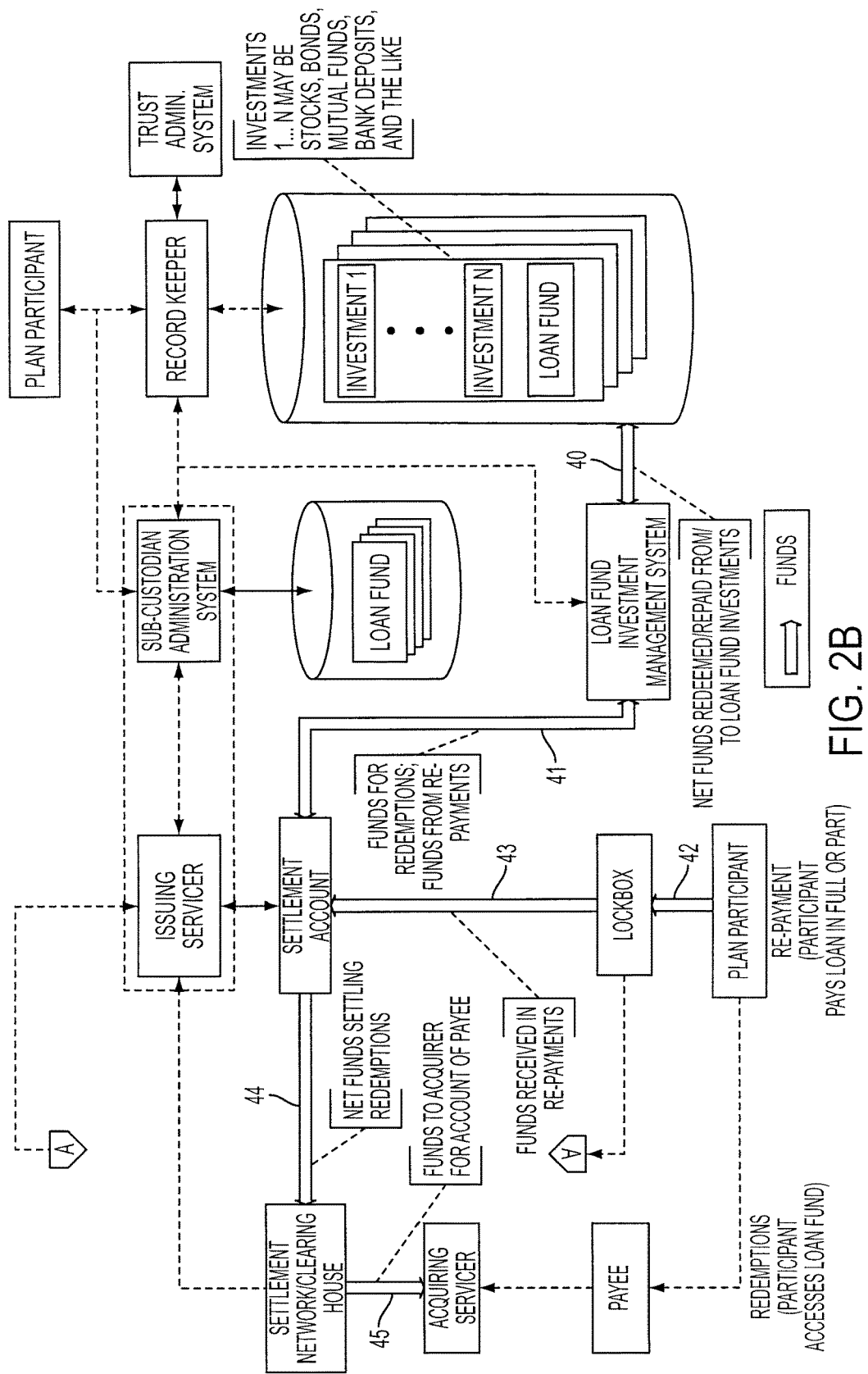

FIGS. 2A-B illustrate an embodiment of a system structure of the invention. With reference first to FIG. 2A, to the right in this figure are the elements and systems usually found in established benefit plans, namely elements 10'-14. To the left in this figure are the elements and systems usually found in established payment systems, namely elements 10" and 30-33. The participant appears twice in these figures, at 10' as a beneficiary of the benefit plan and loan fund and at 10" as a user of a loan fund provided by the invention. The present invention adds primarily elements 20-22 which collectively act to manage the loan fund. In U.S. embodiment, the loan fund is preferable structured as a sub-custodian plan (similar to a self directed brokerage account) of the benefit-plan trust. (In other embodiments, this invention may incorporate some or all of the benefit plan and the payment system functions. In particular, if the present invention is practiced by a bank, issuing servicer function 23 may be conveniently practiced along with the invention's methods; if the invention is practiced by an investment manager, management functions 24 would naturally be practiced along with this invention's methods.)

In FIG. 2A, solid arrows represent message communication. Alternatively, a batch of messages may be accumulated in a file and periodically (hourly, daily, or so forth) communicated as a file transfer. Further in FIG. 2A, all systems and message/file transfers have individual reference numerals. In turn, FIG. 2B illustrates funds transfers by hollow arrows (dashed, hollow arrows in FIG. 2A), all having individual reference numerals. Because identical systems and message/file transfers (dashed, solid arrows in FIG. 2B) appear in FIGS. 2A and 2B, for convenience and clarity, only funds transfer have reference numerals in FIG. 2B.

Turning first to the right-hand systems usually found in established benefit plans, trust administration systems 11 and plan record keeper 12 perform overall management of the benefit plan, ensuring that the terms of the employers trust agreements (i.e., plan policies) are carried out in a manner consistent with statutory and regulatory requirements. Trust systems 11 communicate, on one hand, with employer systems (not illustrated) receiving employee salary and contribution information, and on the other hand, with plan record keeper 12. Record keeping is a largely administrative activity conceptually separate from trust management and often physically delegated to separate systems or even to separate organizations. Administrative record-keeper systems 12, inter alia: maintain plan database 13 including, at least, information characterizing each plan participant's account including its investments; receive instruction from and provide status information to trust administrator systems 11; receive requests from and provide account information to participants 10'; receive employee contributions from employers (not shown); exchange funds with the managers of the participant investments (not shown); exchange funds with the investment manager component of this invention; and so forth.

For example, in the U.S., benefit plans are often services provided to employers by mutual fund organizations, such as Fidelity, Vanguard, to name a few. In this case, although systems 11 and 12 and database 13 may all be within the mutual fund organization (or an administrative subsidiary of the mutual fund organization), they are typically implemented by separate software systems optionally running on separate hardware server systems. Additionally in this case, because investments available to participants may be largely limited to the funds provided by the mutual fund organization, the investment manager systems may also be within the same organizational structure.

The left hand systems are those usually found in established payment systems that process access vehicles. Most access vehicles that the invention interfaces to are "issued" by an issuing servicer, in the U.S. usually a bank, which processes and funds its issued access vehicles. When a payer uses an issued access vehicle in a transaction, the settlement system for that vehicle ultimately returns a payment request to the issuing servicer (or bank) for payment and presentation to payer. It is also common for the issuing service to authorize use of its issued access vehicles at transaction time, for example, checking for sufficient payer funds (or that a line of credit will not be exceeded). Because the issuing servicer is thus the sub-custodian's portal to loan redemptions, the sub-custodian administration systems 20 must smoothly interface and closely cooperate with issuing servicer systems 23, as indicated by the dashed box enclosing these systems in FIGS. 2A-B. Indeed, in some embodiments of the invention, both systems may be part of related organizations. Further, in other embodiments, the sub-custodian administration system 20 may interface to more than one issuing servicer so that loan-fund participants may have the convenience of alternative access vehicles.

In more detail, on the loan redemption side, loan-fund participant 10" presents 34 one of the access vehicles provided by the loan fund to payee 30 in satisfaction of a transaction. Payee 30 then periodically (for example, daily) forwards a batch of access vehicles received in transactions to acquiring servicer 31, usually a bank, which acquires these vehicles from the payee and credits the payee's account with their value (minus a fee). Servicer 31 then periodically (for example, also daily) forwards a batch of access vehicles received from its payees on to the appropriate settlement network (e.g., the MASTERCARD or the VISA networks) or clearing house system (e.g., the U.S. Federal Reserve Bank cheek clearing system) for payment. The settlement/clearing systems net the access vehicles and forward to issuing servicer 23, also usually a bank, a request for net payment (or other net transfer) along with records indicating which participant 10" paid what amount to which payee 30. Accordingly, issuing servicer 23 then orders 28 (or requests, both usually by electronic communications) funds transfer from its settlement account 25 to settlement/clearing system 32.

On the loan repayment side, the sub-custodian administration system, after determining each plan participant's outstanding loan, calculates the next required minimum principal and interest payment (and an optional full principal and interest payment), which it forwards 29 to participant 10' (equivalently, 10"), optionally along with records of the participant's redemption transactions (for example, as a paper or electronic statement). This calculation is performed at a selected frequency (weekly or monthly if a loan balance is outstanding) and according to selected rules so that all applicable statutory and regulatory mandates are met along with any more restrictive benefit-plan policies. In response to payment requirements, participant 10" forwards repayment instructions, typically, to a separate payment-handling organization, "lockbox" 33. A lockbox has delegated to it the responsibility for receiving, forwarding, and appropriately applying payments, both for this invention as well as for other financial systems in the usual case (i.e. it acts as a provider funds-acceptance service). Alternatively, the present invention could itself supply the lockbox (or funds-acceptance) function, Administrator system 20 is informed (preferably by electronic communications) of a participant's payments, and updates the loan-fund records for the participant.

Turning to FIG. 2B to review the funds flow during redemptions and repayments, first, settlement of loan redemptions for plan participants' results in net flow 44 of funds to settlement/clearing systems 32, which then in turn forward the funds to the correct acquiring servicers 45 for the account of the various payees. Loan repayments begin with participant 10" forwarding 42 funds to the designated lockbox 33, which then in turn forwards 43 them on to settlement account 25 of the invention. The settlement account receives 41 settlement funds transferred from a participant's loan fund; repayment funds are forwarded 41 for acceptance into and ultimate deposit 40 to the participants' loan-fund investment. (In this embodiment, the settlement account acts as a funds transfer buffer between the loan fund and the entities receiving or providing funds; in alternative embodiments, the settlement account may not be needed, all funds flowing directly from the loan fund.)

One of skill will understand from this description and the appended figures how to adapt this invention to other payment systems.

Sub-Custodian System Structures

FIGS. 2A-B also illustrate the specific elements of an embodiment, elements 20, 21, and 22, and closely associated with those specific elements, elements 23, 24, and 25 (which may optionally be practiced along with the methods of this invention), along with the associated electronic message/file exchanges and funds flows.

The sub-custodian administration system 20 plays a central role in the invention, preferably implementing the methods described subsequently. It receives instructions 26 from benefit-plan record keeper 12 for establishing loan-fund investments (maintained and managed by loan-fund investment management systems 24) and lines of credit (LOC) values for a new plan participant; provides 26 status information to record keeper 12 including a participant's current account balances, outstanding loan redemptions, and available LOC; and receives further instructions 26 for modifying or terminating a participant's loan-fund investments. Loan-fund establishment includes, inter alia, initializing loan-fund information 22 in database 21, and accepting into the loan fund initial funds transferred from the benefit plan. The instructions (equivalently, requests and responses) are preferably electronically transmitted between the various systems.

System 20 also provides orders to loan-fund investment management system 24 to cause and monitor asset transfers from a participant's account consequent to loan redemptions from 41 a participant's loan-fund account, and also loan repayments accepted into 41 a participant's loan-fund account, and also to cause and monitor funds transfers 40 with the benefit plan. Transfers with the benefit plan occur consequent, inter alia, to initial funding of the loan fund, as well as consequent to subsequent funding changes occurring when participants designate more (but always less than the ALA value) or less of their benefit-plan assets for investment in their loan funds 5 (FIG. 1). Final transfer to other investment vehicles in the benefit plan occurs when the loan fund is terminated.

Periodic transfers to benefit-plan accounts may also occur consequent to the accrual of accumulated interest and dividends into the participants' benefit-plan accounts. Interest may be paid by participants on their outstanding redemptions (at, e.g., a market rate in order to maintain the redemptions' advantages), and is received by the loan-fund investment management system 24 (directly or indirectly) from lockbox 33. Dividends may be earned on (unredeemed) balances remaining in the loan funds, and is received by the loan-fund investment management system from the investment vehicles in which the loan fund is invested.

These interest and dividend funds are preferably accumulated to the account of the participants at the loan-fund investment management system, and are periodically transferred ("swept") into the benefit plan system 14, where participant benefit-plan assets are accordingly updated. If the transferred interest and dividends update that participant's vested benefit-plan assets, the participant's ALA may be automatically updated. (However, the participant's LOC will not be updated unless the participant requests that some of all of these funds be invested in that participant's loan fund.)

In one embodiment, interest and dividend funds may be deposited directly into the participant loan fund by the loan-fund investment management system, and the ALA and LOC values may then both be automatically updated, assuming that such updates qualify under plan rules and governmental guidelines.

Additionally, system 20 interfaces closely with issuing servicer 23 (or the equivalent financial institution) and indirectly (or directly) controls funds transfers through settlement account 25 (by electronic requests and responses). Information received 27 from servicer 23 includes transaction records of participants' loan redemptions, currently available LOC values, periodic requests for funds for settlement of redemption transactions, and the like. Information sent 27 to servicer 23 includes current maximum allowed LOC values, which in most cases the servicer uses to authorize payments at transaction time (e.g., by comparing a requested redemption with the available LOC value. (The redemption is authorized if less than the LOC value and the LOC value is reduced by the redemption; the redemption is refused or not permitted if greater than the LOC). Generally, the information exchanged is adapted to the needs of proper sub-custodian administration.

To perform these functions, the sub-custodian administrator system of the current invention maintains database 21 describing the loan fund and its participants. For each loan-fund participant, database 21 maintains records 22 of loan-fund redemptions due to access vehicle transactions, loan-fund repayments, current balances in loan-fund-investment-management system 24, current amounts of these balances assigned to loan-fund redemptions (i.e., the participant's current line of credit (LOC) values, available loan amounts (ALA) values), administrative information, historical audit information, accrued interest, dividends earned, and so forth.

The present invention includes the possibility that a participant may chose to invest in the loan-fund investment vehicles as well as use this investment vehicle to provide for loan redemptions. In such an embodiment, the administrator system may also maintain the amount in the loan fund investment to be retained for investment purposes along with the amount to be made available for loan redemptions (the sum of these two amounts typically being the participant's total loan-fund invention balance).

Further, this database 21 preferably also includes administrative information describing the loan funds supported along with system information for operating and interfacing to the various computer systems illustrated in FIGS. 2A-B. In certain embodiments, because the methods and systems of this invention may serve employers in various jurisdictions and benefit plans with various loan policies, administrative information includes information for performing loan determinations, calculations, payments, reporting, and so forth, for each plan, employer, and jurisdiction as needed. This information may be, for example, represented as rules indexed by jurisdiction and benefit plan and stored in the database. Whenever necessary, the methods retrieve the appropriate rule in order to make a required determination in accord with statute, regulation, and plan policy. In further embodiments where the invention interfaces to several separate payment systems, administrative information also advantageously includes payment interface rules preferably represented in similar fashions.

The messages exchanged illustrated in FIGS. 2A-B are described in Tables 1 and 2 for an illustrative embodiment. Table 1 describes primarily the purpose of the message, while Table 2 describes the message flow and contents. In alternative embodiments, the information may be exchanged as individual message or batched into files of many messages.

TABLE 1

| File/message | Purpose |
| --- | --- |
| Account file | Directions from the trustee/record keeper responsible for the plan to the sub-custodian responsible for the loan- fund investment and for its use as an access vehicle |
| Maintenance report | Current status of the loan-fund investment from the sub-custodian |
| Trust transfer completed file | Confirmation of fund transfer between the plan trust administrator and the loan-fund manager |
| Daily dividend report | Updates the sub-custodian (and its record keeper) with the dividend income earned by the loan-fund account |
| Account status file | Instruction to access-vehicle servicer on maximum credit allowed |
| General ledger (G/L) settlement report | Instructions regarding settlement of redemptions and repayments by the participant from their loan-fund account |

TABLE 2

| File/message | Exchanged between (ref. No. in FIG. 2A) | Contents |
| --- | --- | --- |
| Account file | Plan record keeper → Sub-custodian admin. system (26) | Batch no.; ACNT; ID; Amount of credit line; SC |
| Maintenance report | Sub-custodian admin. system → plan record keeper (26) | ACNT; SSN; Amounts of— credit line, money market balance, loan balance, total dividends earned, total interest paid; total fees paid to plan (whether paid as interest to plan or fees); Date amounts as-of; SC |
| Trust transfer completed file | Investment manager sys. → sub-custodian admin. system (38) | Batch No.; ACCNT; Amount transferred; Date received |
| Daily dividend report | (same) | ACNT; Amount of loan-fund balance; Amount of dividend; Date amounts as-of |
| Account status file | Sub-custodian admin. system → issuing servicer (27) | ACNT; ID; Amount of credit line; SC |
| General ledger (G/L) settlement report | Loan admin. system → Sub-custodian admin | G/L accounting fields; settlement transfer instructions; Amount to transfer |

In these tables, the "File/message" column provides a conventional name for the information exchanged or for the file. Generally, the information is exchanged periodically (for example, daily) in the form of files of a batch messages accumulated during the day. The "Exchanged between" column provides the names of the entities exchanging the named information along with the reference numeral in FIG. 2A of the exchange. The "Purpose" column generally describes why the information is being exchanged.

Finally, the "Contents" column provides a summary of the message contents or the contents of each file record. The following abbreviations are used in the Contents column: ID for participant identifying information (ID) such as name, address, phone no., social security number (SSN), birth data, security key (ex., mother's maiden name); ACNT for participant account identifying information; SC for action/status codes describing the account action the information parameterizes, for example new account, credit line increase or decrease, close account—employment termination, close account—death, close account—default, close account—plan termination; and batch number for identifying the actual file or message exchanged.

Implementation of the Invention's Systems

Figure 5:
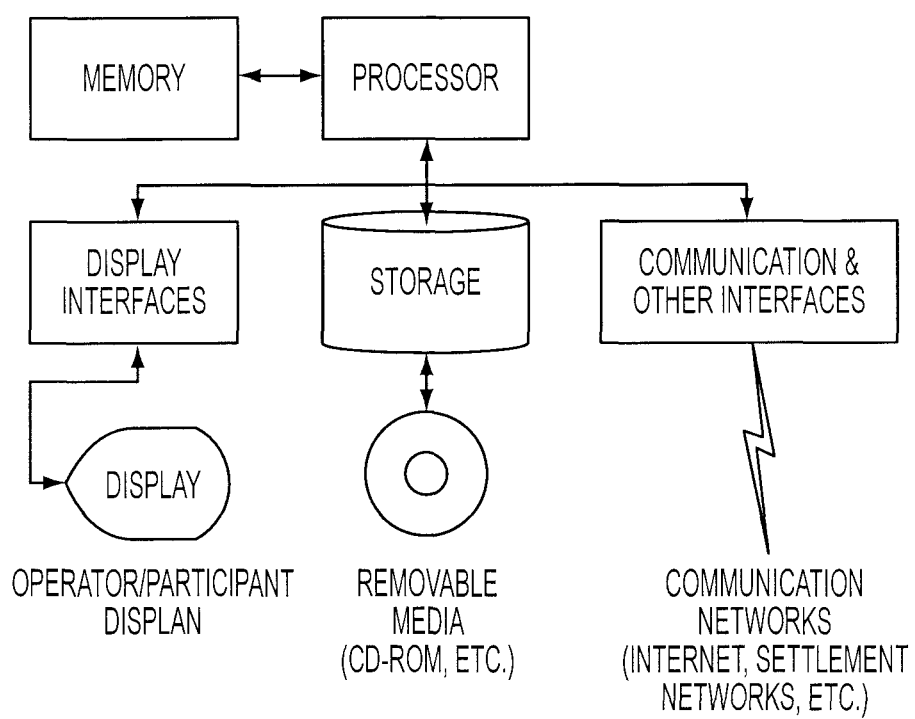
FIG. 5 illustrates a preferred computer system for performing software that implements methods of the present invention.

Sub-custodian administrator system 20 is preferably implemented with one or more standard server-type computer systems. FIG. 5 illustrates an exemplary server-type system. Suitable systems include Intel-based servers such as are widely available from, e.g., IBM, Dell, Hewlett-Packard, Compaq, to name a few. Suitable operating software includes a Microsoft windows family system, such as Windows NT or XP server, or a UNIX family system, such as Linux from Redhat. Database 21 is preferably stored on attached disk storage and managed by Oracle database software, by IBM DB2 database software, and the like. The server systems are linked to general communication networks, such as the Internet, and to dedicated special-purpose financial networks, such as clearing networks, by communication interfaces.

The use of the term "computer system" (or of "system" where computer system is understood) is meant to includes systems of one or more cooperating computers, each computer including one or more cooperating processors and memories.

Functions and methods performed by the sub-custodian administrator systems 20 may be programmed in a convenient language, for example Java, C++, C, or by means of an application generator. Programs are compiled to executable code (or interpreted), loaded into memory, and executed by the processor. Executable programs may be stored on and loaded into memory from computer-readable, removable media. These media include optical media, magnetic media; download from a server across a computer network, and the like as known in the art.

In an exemplary programming paradigm, known as an event-based paradigm, the programs may be structured as modules that process each incoming message or file, updating databases, and generating consequent request messages or files. Other modules may be periodically invoked to monitor and respond to changes in, e.g., participant status, funds levels, or so forth Methods of the Inventions Described herein with respect to FIGS. 3A-B are the participant repayment and redemption processes of the present invention; and with respect to FIGS. 4A-C, the processes for loan-fund application, set-up, and modification.

Figure 3A:
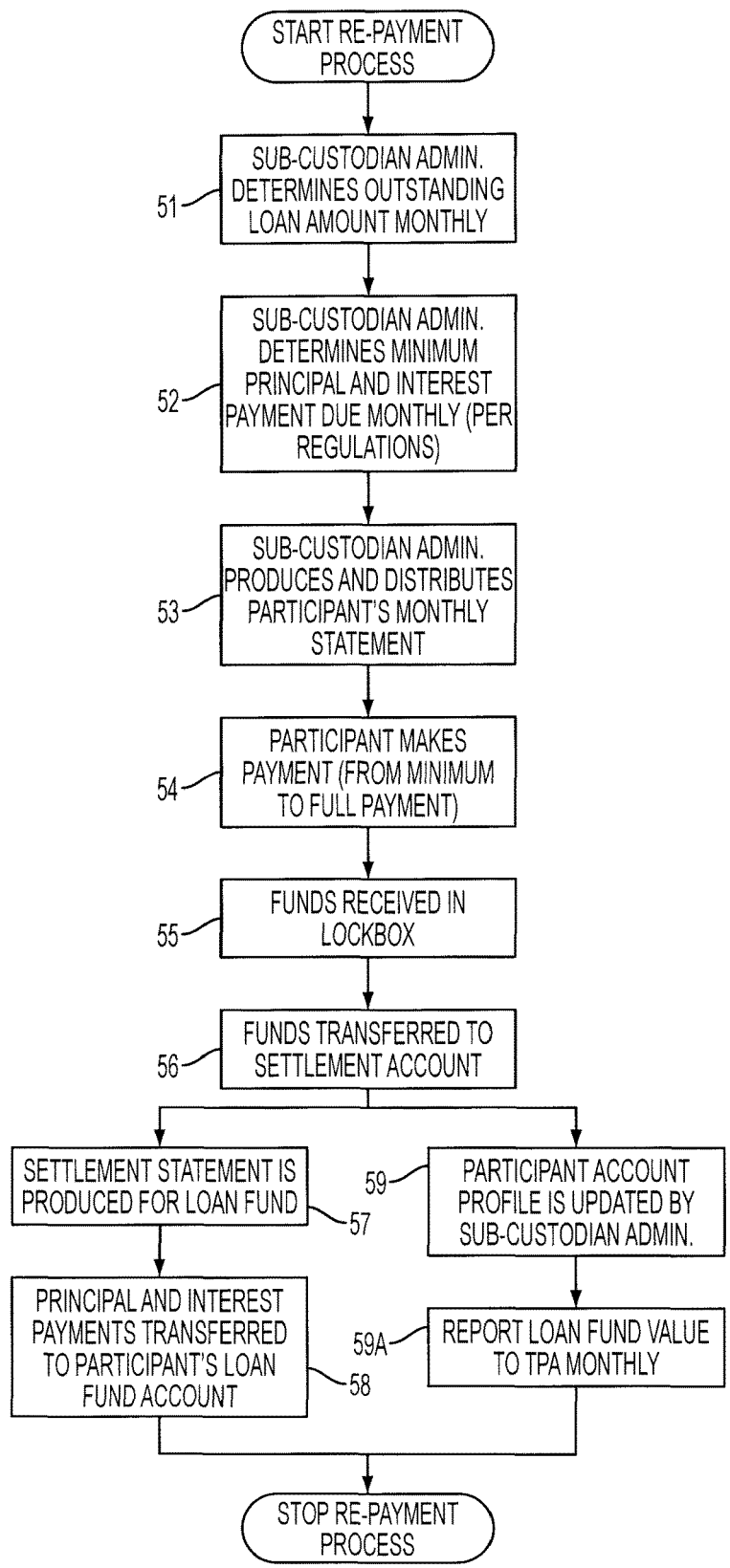
FIGS. 3A-B illustrate preferred repayment and redemption processes of the present invention.
Figure 3B:
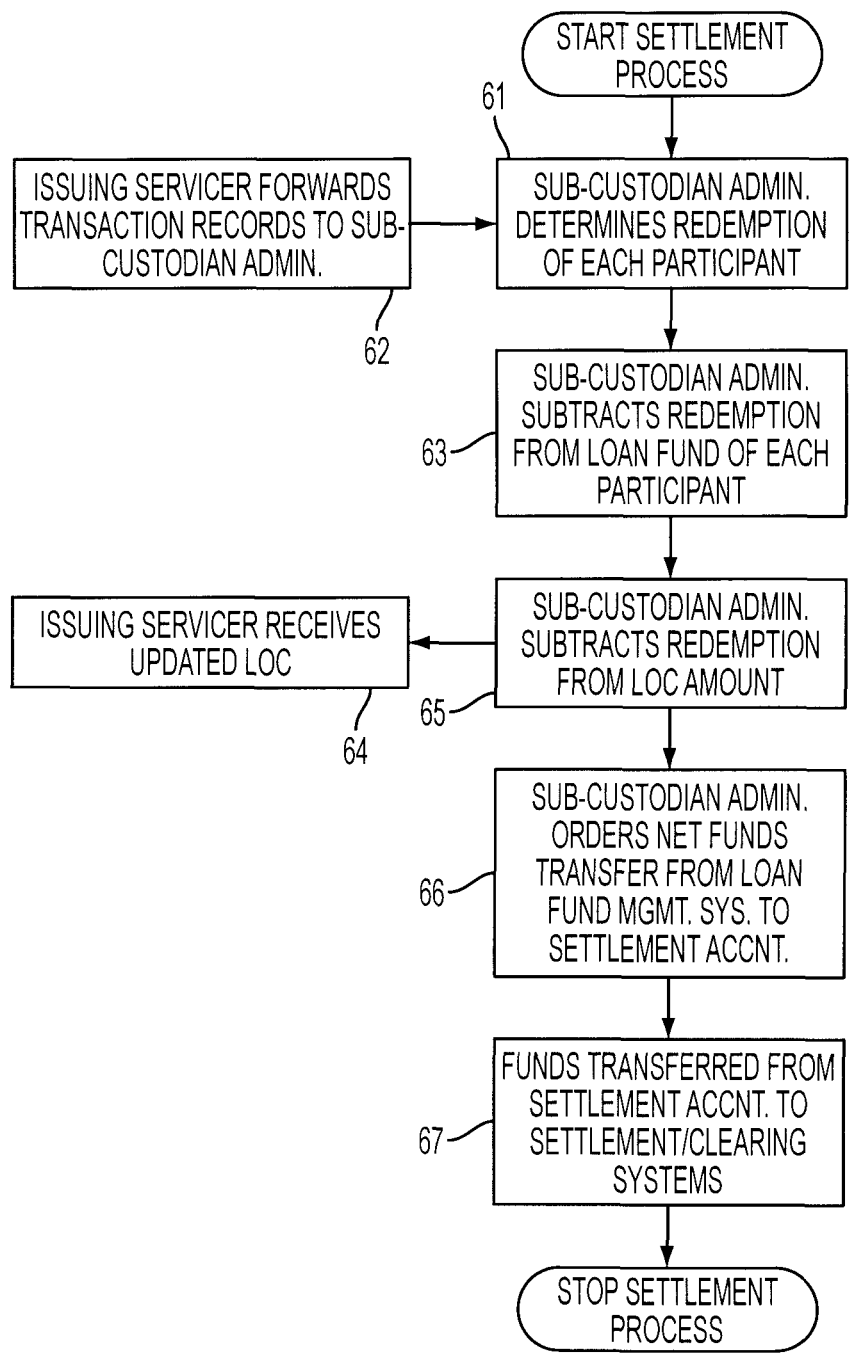

FIG. 3A illustrates an embodiment of the participant loan repayment process of the present invention. Periodically, preferably monthly or more frequently, for each loan-fund participant, the sub-custodian administrator system 20 (also referred to in this subsection as the "administrator system" or the "administrator") determines 51 the monthly outstanding loan amount, for example, by adding the sum of the participant's repayments minus participant's redemptions and interest due on and fees charged to the previous outstanding loan amount. The redemption and repayment information has been received from, for example, the issuing servicer 23 and the lockbox system 33. Repayment information is forwarded (28 in FIG. 2A) to the issuing servicer 23 from the lockbox system 33. Next, the administrator system 20 determines 52 minimum principal and interest payments due from the participant according to the regulations applicable in the jurisdiction of the benefit plan (for example, in the U.S. from 26 U.S.C. § 72), and formats and distributes 53 the participant's monthly statement preferably listing transactions, amounts due, and loan-fund balances, and the like. Distribution may be by mail, or by on-line electronic means, or so forth.

Next, the participant pays 54 at least the minimum amounts due or optionally up to the entire loan balance. Repayments are received 55 by the lockbox system 33 and forwarded 56 to the system settlement account 25 with a payment report forwarded 57 to the issuing servicer (and then on to the administrator).

Lastly, the administrator system orders the transfer of funds 58 from the settlement account and acceptance 25 into the loan-fund investment manager system (24 in FIG. 2A) for the accounts of the participants. Concurrently, the administrator 20 may update 59 in its database (21 in FIG. 2A) participant records with current loan-fund balance data, outstanding redemptions, and corresponding current LOC value. The LOC value is also forwarded to the issuing servicer 23 so that it may properly authorize transactions for the participants.

Next, FIG. 3B illustrates an embodiment of the access vehicle redemption process. Periodically, preferably daily (or at another frequency determined by the characteristics of particular access vehicles and their processing systems), the redemption process starts with the administrator system 20 determining 61 total redemptions for each participant. The redemptions are, for example, determined from the sum of all the participant's transaction amounts for that period forwarded 62 from the issuing servicer 23. (Alternatively, the issuing servicer may receive and send net redemption information from the settlement network, supplemented by any "own" redemptions (a transaction in which the issuing servicer also acquires the transaction).) It is the issuing servicer 23 that interfaces directly with the particular payment systems, and authorizes transactions and receives completed transaction information. The administrator 20 then updates the current loan-fund balance 63 and the current LOC value 64 by, e.g., subtracting redemptions from their previous values. Optionally (not illustrated), the administrator system may also add to these values repayments of both principle and interest received during the period. The administrator may then post or have posted the updated line of credit (LOC) online for use by Visa or Mastercard or other credit card systems or ACH, or alternatively, have a direct connection to update the LOC in those systems.

Next, the issuing servicer 23 receives 64 the new LOC value so that it may properly authorize transactions during the next period. The administrator also orders the loan-fund investment manager system 24 to transfer net funds 66 from the loan fund to the settlement account 25 from the accounts of the participants. Finally, the settlement account forwards funds 67 to the settlement/clearing systems 32 for the various access vehicles; these systems then internally distribute funds to satisfy payees.

From FIGS. 3A-B it can be appreciated that the sub-custodian administrator system has no necessary interactions with the benefit-plan systems during cash redemptions or repayments by the participant; these activities occur between the administrator system 20, the established payment systems, and the investment manager for the participant loan-fund accounts. At most, the sub-custodian administrator 20 may update the benefit-plan record-keeper system with information, for each participant, concerning loan-fund balances and their asset composition, interest paid, dividends earned, fees charged, and so forth. This update, and other reporting, is according to the sub-custodian's fiduciary responsibilities to the plan. The benefit-plan systems need not necessarily be concerned about individual participant transactions, either for information purposes or for processing purposes unless they choose to do so.

Further embodiments of the processes of loan-fund application, set-up, and modification are described with reference to FIGS. 4A-C. These processes are illustrated in a preferred Web-based implementation (using HTML formatted "pages") directed to 401(k) plans; alternative embodiments may be implemented using paper forms or use other input means or access other forms of benefit plans associated with the loan fund. Many of the first steps illustrated in these figures are preferably implemented by the plan record-keeper system (12 in FIG. 2A) (or other benefit-plan system) because they relate to the benefit plan in general or to the benefit-plan's responsibility to approve employee loan applications. Certain steps that relate primarily to loan-fund administration are carried out by the sub-custodian administration system upon request by the trust record keeper.

First, a participant/prospective participant (participant) logs 70 into the employer benefit systems and accesses 71 a benefits administration page, which preferably presents a menu of possible benefits for further examination including the 401(k) loan fund of this invention. As illustrated, the participant selects an option to establish the 401(k) loan fund 72 of the invention. If the employee is already a 401(k) plan participant, tested at 78, the system presents 74 the 401(k) loan administration logon page. If the participant is not already enrolled, the system inquires 79 whether the employee wishes to join the employer 401(k) benefit plan. If this is the case, the participant is presented with an on-line registration process beginning at registration 80. If the participant does not want to establish a loan fund, then the system allows them to perform other benefit processing 81 and log out.

Optionally, as illustrated, the 401(k) loan fund has login/ authentication 75 in addition to the general login/authentication of the main employee-benefits system. If login is successful, tested at 76, the participant is then presented with the actual 401(k) loan-fund creation page 76. If not, the participant is permitted a number of additional login attempts. Loan-fund creation/administration 73 also preferably presents a menu of loan-fund options, including application, modification, queries concerning current fund status and balances, and the like. In subsequent figures actions relating to plan application and management are illustrated. Plan queries may be routinely implemented with data returned from database 21.

If plan application or modification is selected, the participant is next presented with an application or modification detail 77, which may preferably have certain fields, such as participant identification fields in the case of plan application or plan description and status fields in the case of modification, already filled in with information known to the record-keeper system. The participant next enters relevant information 77 and submits 85 to the record-keeper system for data validation and consistency checking 86. In the case of incorrect data 87, the participant is prompted 88 to reenter and resubmit correct data. Correct data is passed to record keeper and trust management systems for processing 89.

Figure 4A:
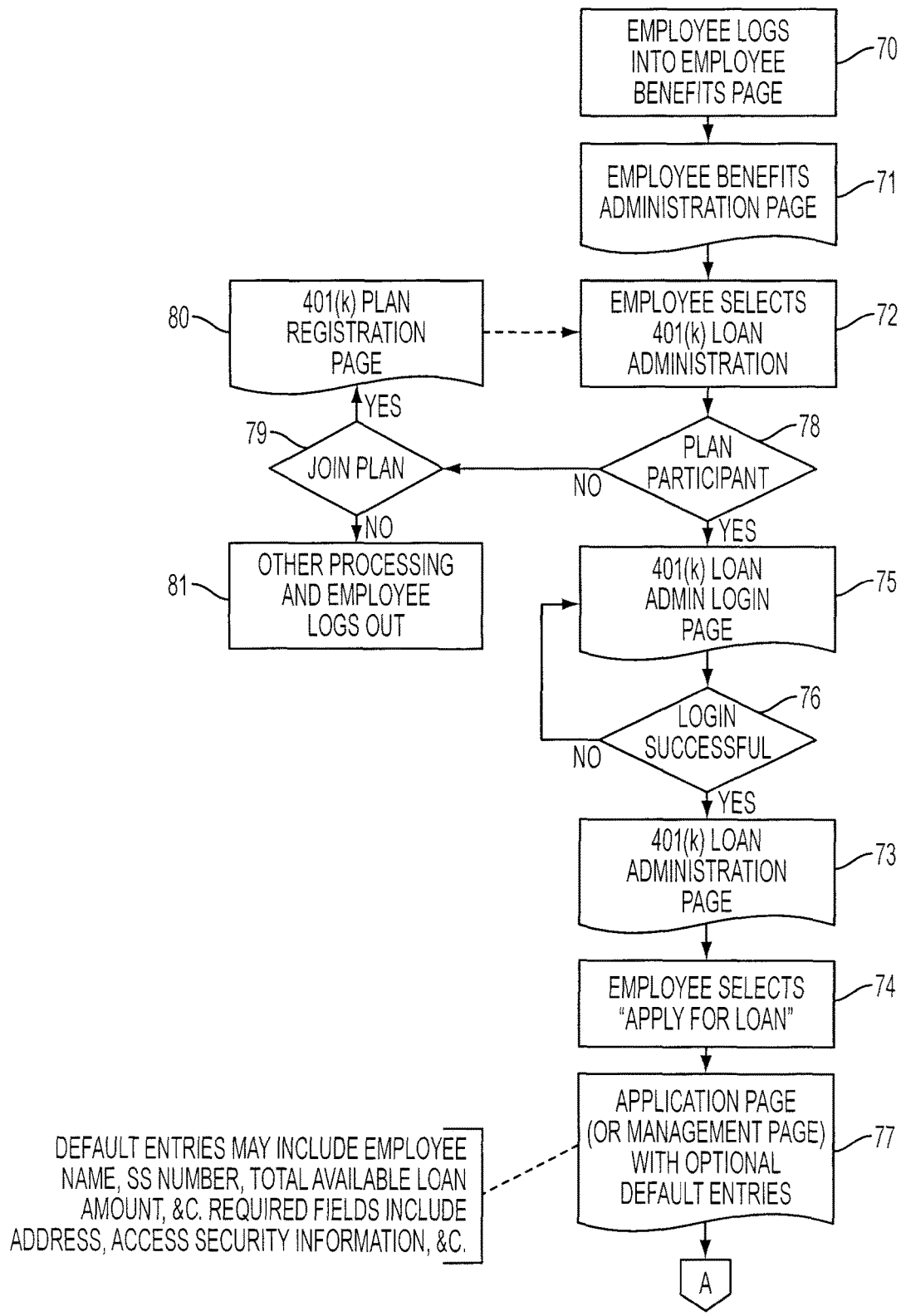
FIGS. 4A-C illustrate preferred loan-authorization and setup methods of the present invention.
Figure 4B:
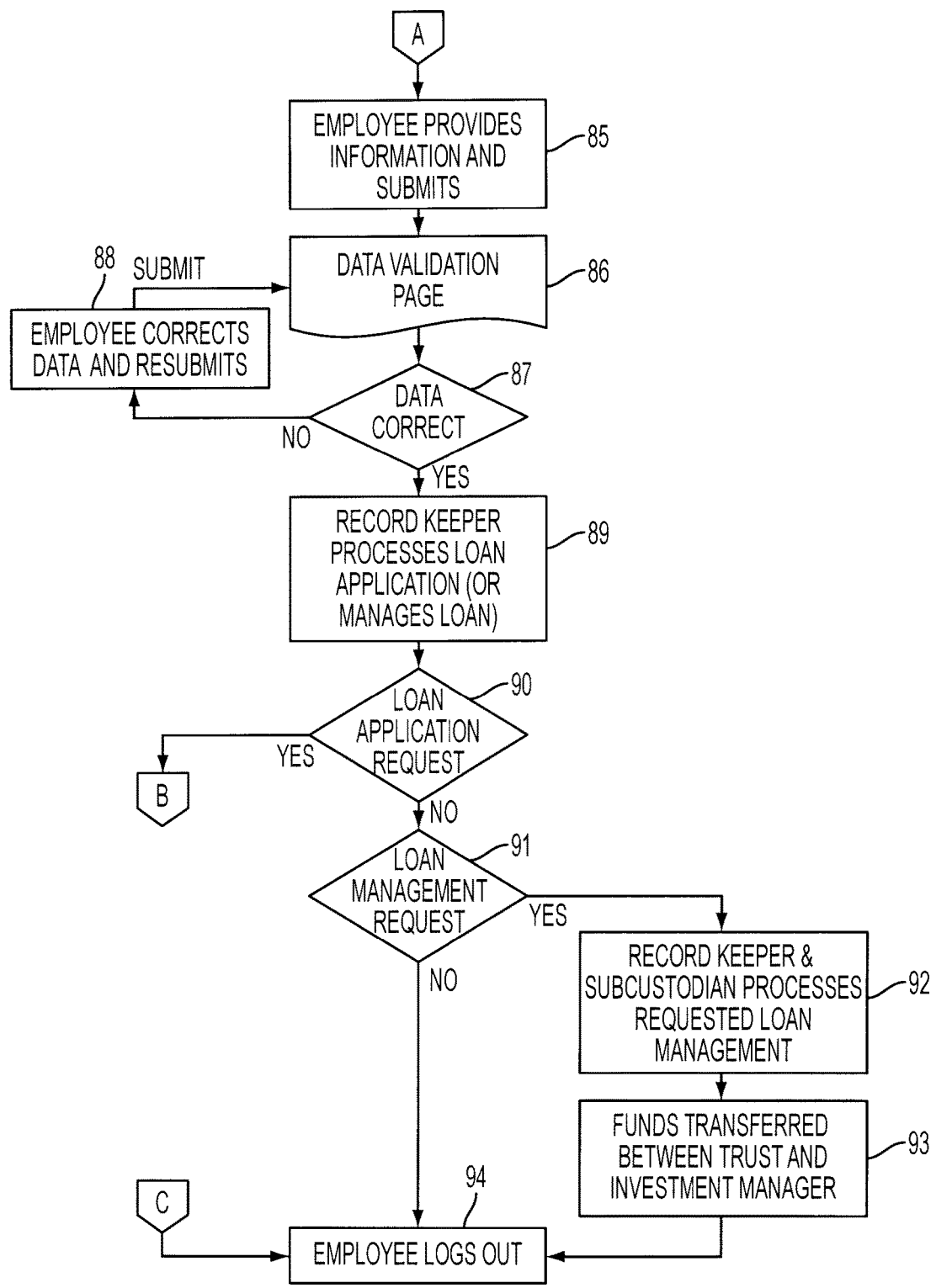
Figure 4C:
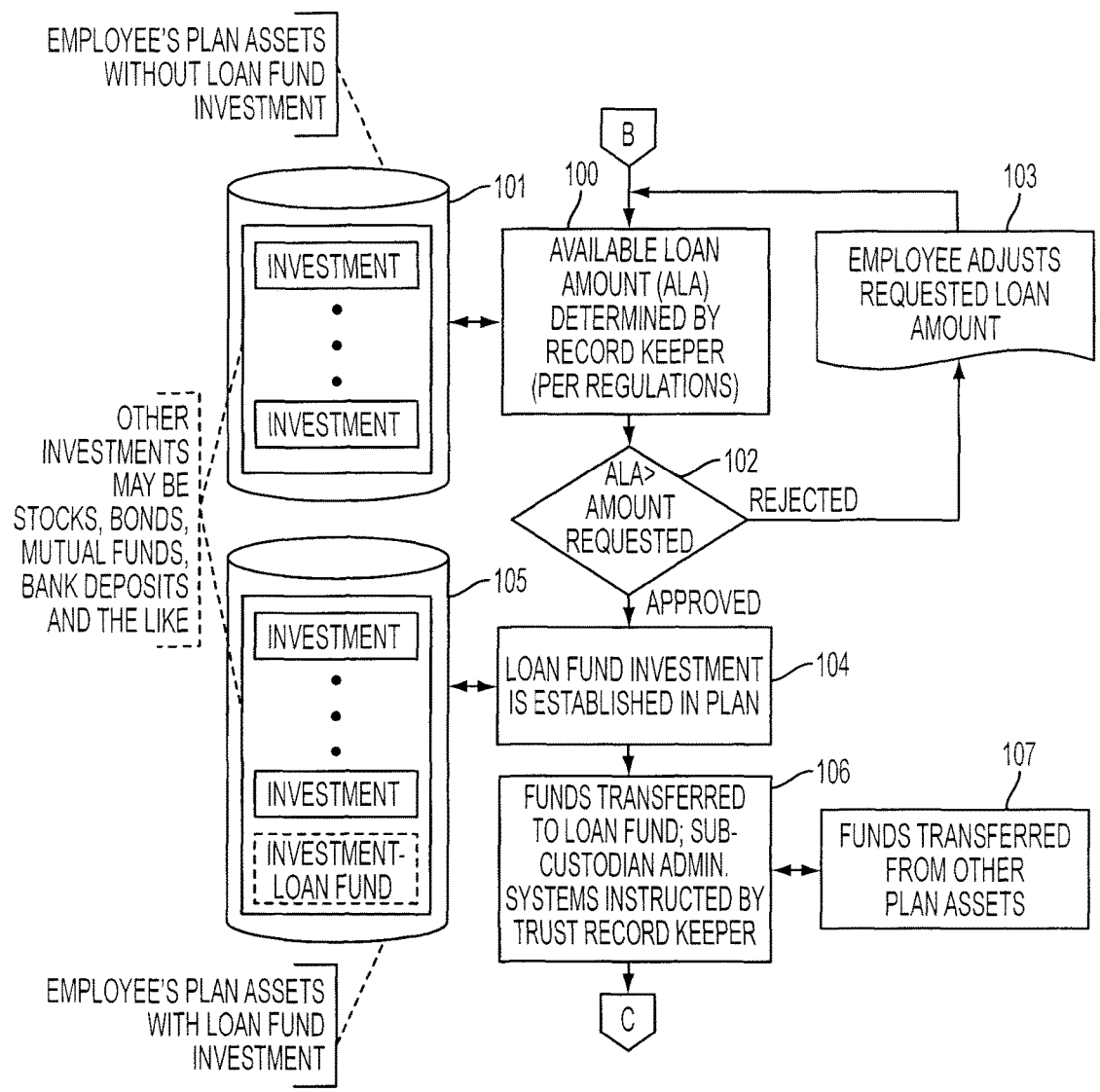

Processing of a loan application 90 (equivalently, an application to join the loan-fund benefit option of the 401(k) plan) jointly by the trust record-keeper systems and the sub-custodian administrator systems of the loan plan is illustrated in FIG. 4C. First, the available loan amount (ALA) value is determined 100 by the record-keeper system. In most cases, the ALA value depends on the vested value of the participant's 401(k) account. Here, database 101 illustrates an exemplary account with several investments. The vested value of these investments is determined by plan vesting rules and the current market values of the investments.

If the participant's requested loan-fund amount (entered in the application page) is equal to or less than the determined ALA value 102, application processing proceeds. If not, the participant is prompted 103 to re-enter a loan-fund amount that is equal to or less then the ALA value provided.

Once an acceptable request has been negotiated with the participant, an investment is created in their benefit-plan account, which is described herein as the loan fund, and is funded, in one embodiment, by the transfer of assets from previous existing investments within the plan, or in another embodiment, by the transfer of funds from outside the plan into the loan fund. In database 105, this is indicated by the exemplary record with the "investment—loan fund." For example, this record would result from record-keeper processing of the input account record illustrated in database 101. Assets for acceptance into the loan fund are next provided from the benefit plan to the loan-fund investment management system (24 in FIG. 2A), which carries out actual investment management of the loan-fund accounts (seeking reasonable dividend income consistent with high liquidity and preservation of value). If sufficient cash is not available, fractions of pre-existing investments are liquidated (investments 1–N) and are redeemed 107 and the funds forwarded (40 in FIG. 2B) by the record keeper to the loan-fund manager. At this time, the record keeper also instructs the sub-custodian administrator systems (20 in FIG. 2A) to make necessary preparations for the new loan-fund account, for example, by initializing a database record describing the new participant and the parameters of the associated loan fund, notifying the access vehicles selected by the participant, initializing issuing servicer systems (23 in FIG. 2A) to be ready to process participant transactions, and so forth.

In other words, for each participant benefit-plan account, an ALA value is calculated from their current vested interest in the pension plan and limitations, if any, imposed by statute or regulation or by policies of the benefit-plan sponsor. In view of the determined ALA value, a participant then selects a value for investment in the loan fund to be established, or for modifications to an already established loan fund. If the entire value of the ALA is invested in the loan fund, then the value invested in the loan fund is necessarily equal to the ALA value.

Returning to FIG. 4B, in the case the participant requests modification of an already existing loan-fund account 78, the data entry and validation steps 85, 86, 87, and 88 are performed to validate and consistency check the submitted request. Test 90 and 91 direct modification to steps 92 and 93, which are an abbreviated representation of this processing. Preliminary to 92, negotiation steps, not illustrated but similar to steps 100, 102, and 103 of FIG. 4C, may negotiate with the participant to achieve an acceptable request. Next, the record keeper processes 92 the modification request and provides instructions to the sub-custodian administrator systems to do likewise. As a result of the modification request funds may need to be transferred 93 (40 in FIG. 2B) between the loan-fund investment manager (upon the request of the sub-custodian administrator systems) and the trust (upon request/approval of the trust systems). For example, funds may be transferred from the trust if the participant requests an increased investment in the loan fund; funds may be transferred to the trust if the participant requests a reduced investment in or even total liquidation of the loan fund and reallocation of its assets to other investments in the benefit plan.

From FIGS. 4A-C it can be appreciated that substantial interaction and cooperation, including funds transfer, between the sub-custodian administrator systems 20, and other closely associated systems, and the trust record-keeper systems 12, and other trust systems, is needed only when the participant makes macro loan-fund investment decisions. Such loan-fund investment decisions, like most plan investment decisions, are expected to be relatively infrequent (more likely monthly or a few times per year). Further, during these interactions the plan systems of this invention appear to the trust systems largely as just an additional participant investment, managed and reported in already established manners. Accordingly, fashioning this interface is relatively inexpensive, requiring little modification of existing trust or record-keeper systems. Further, the present invention of the loan fund imposes no additional processing burden on the existing trust systems.

It has been discovered that by operating at the record keeper and/or benefit plan level, embodiments of the invention realize special synergies of aggregation that allow reaching thresholds to permit the selection and use of particular desirable investment vehicles. Additionally, by divorcing the redemption/repayment operations from the benefit plan or plans and aggregating loan fund account assets from large numbers of participants, it has been discovered that multiple loan fund accounts, each invested in a different investment vehicle, can be administered, thereby allowing benefit plans to offer their participants loan fund account investing options to facilitate complex investment strategies.

Figure 6:
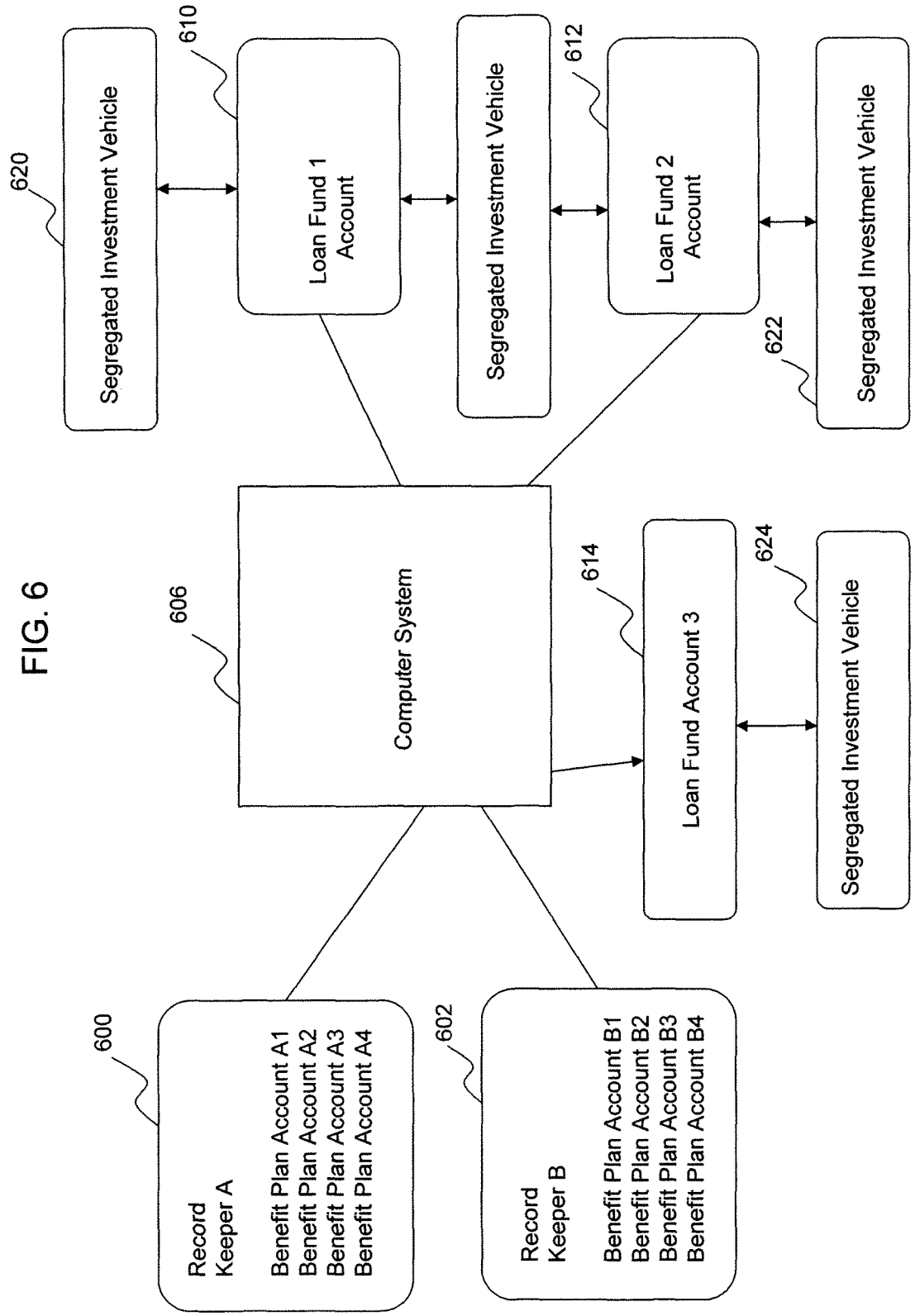
FIG. 6 is a schematic diagram of an embodiment of the invention using multiple loan funds, each associated with a different investment vehicle or set of vehicles.

Referring to FIG. 6, multiple record keepers 600 and 602 are illustrated. These record keepers function, in one embodiment, provide record keeping services for one or more benefit plan accounts and their respective participants. In FIG. 6, record keeper A maintains records for benefit plan account A1, benefit plan account A2, benefit plan account A3, and benefit plan account A4. Likewise, record keeper B maintains investments and records for benefit plan account B1, benefit plan account B2, benefit plan account B3, and benefit plan account B4. Each different one of these benefit plan accounts would, in one embodiment, be associated with a respective different employer or other plan sponsor. In one embodiment, the benefit plan account comprises a pension fund for employees of an employer. The participants in the benefit plan account would have participant assets in typically one, but potentially multiple of the benefit plan accounts.

FIG. 6 further shows a computer system 606 for maintaining and administering a first plurality of loan fund accounts 610, 612 and 614. Each of these loan fund accounts is designed to process a plurality of loan requests, each loan request for less than or equal to the full amount of funds in loan fund account. Note that it is understood by one of ordinary skill in the art that there are multiple accounting processes that operate on these accounts. However, in the present invention, a redemption/repayment accounting process is associated with each of the loan fund accounts and comprises the day-to-day accounting process that computes the current balance of available funds in the loan fund account based on the redemptions from and payments to the assets in the loan fund account, per the claim language, so that a loan fund asset amount listed in the account information of the benefit plan account relating to the loan fund account is not changed. This operation is reflected in block 700 in FIG. 7. Each different loan fund account 610, 612, and 614 is associated with a respective one or more of the benefit plan accounts, and is funded by participant assets of the respective participants associated with the one or more of the benefit plan accounts A1-A4 and B1-B4. These participant assets used to fund the different respective loan fund accounts are referred to as loan fund assets. These loan fund assets may be drawn for loans from each of the different loan fund accounts 610, 612 and 614, and each of the loan fund accounts are capable of maintaining both assets and debts. The operation of administering comprises processing redemptions and credits made by participants against the loan fund assets, calculating a current balance of available funds and computing accumulated interest on the loan fund assets.

Note that the assets for the respective loan fund accounts, in one embodiment, would be obtained by one or more participants in a respective benefit plan designating selected funds to be used for the one or more loan fund accounts. This money from a plurality of the participants of a given benefit plan account would then be aggregated and invested or directed to be invested in the designated one or more loan fund accounts.

The computer system 606 further maintains an association of each different one of the first plurality of loan fund accounts 610, 612 and 614 with a respective different investment vehicle 620, 622 and 624. This operation is reflected in block 710 in FIG. 7. Each investment vehicle is a part of a respective one or more benefit plan accounts but is segregated from other investment vehicles in the respective one or more benefit plan accounts. For example, loan fund assets for the loan fund account 620 could be invested in a money market fund which contains only participant assets designated for the loan fund account. Loan fund assets for the loan fund account 622 could be invested in a specified mutual fund which contains only participant assets designated for that loan fund account 622. Likewise, loan fund assets for the loan fund account 624 could be invested in a bank demand deposit account which contains only participant assets designated for the loan fund account 624.

In operation, the computer would receive a selection from a selecting entity of one or more of the loan fund accounts from among the first plurality of loan fund accounts 620, 622, and 624. This operation is reflected in block 720 in FIG. 7. In one embodiment, the selecting entity is a record keeper. In this embodiment, each Record Keeper (Record Keeper A, Record Keeper B, etc.) is provided electronically or on paper with an option to use more than one loan fund account (Loan Fund Account 620, Loan Fund Account 622, Loan Fund Account 624, etc.), each of which is associated with and invested in a different investment vehicle, as per the example above. In a further related embodiment, the selecting entity is a benefit plan account. In this embodiment, each Benefit Plan Account (Benefit Plan Account A1, Benefit Plan Account A2, . . . ) using the services of a given Record Keeper (Record Keeper A) may be further provided electronically or on paper with an option to use more than one loan fund account (Loan Fund Account 620, Loan Fund Account 622, Loan Fund Account 624, etc.). In a still further related embodiment, the selecting entity is a participant. In this embodiment, each participant (Participant A1-1, Participant A1-2, . . . ) of a Benefit Plan Account (e.g., Benefit Plan Account A1) is provided with an option to select from more than one loan fund account (Loan Fund Account A1, Loan Fund Account A2, etc.) as the investment vehicle in which the loan fund assets are invested. In one embodiment, an individual benefit plan account participant will have all of its individual loan fund assets in a single Loan Fund Account. However, in an alternative embodiment, an individual plan participant would be capable of designating its loan fund assets to be split among multiple Loan Fund Accounts associated and invested in different investment vehicles or combinations of investment vehicles.

In a further embodiment, a selection could be received from a record keeper of a second plurality of the loan fund accounts, for example, a selection of loan fund accounts 610 and 614, but not loan fund account 612. This selected second plurality of loan fund accounts would then be made available by the benefit plan account or its plan sponsor to its participants, who could then choose one or more of the second plurality to use. Thus, a selection could be received directly or indirectly from one or more of the participants associated with the one record keeper of at least one of the second plurality of loan fund accounts to invest loan fund assets of the one or more participants.

In a further embodiment, a selection could be received from a benefit plan account or its plan sponsor of a second plurality of the loan fund accounts, for example, a selection of loan fund accounts 610 and 614, but not loan fund account 612. This selected second plurality of loan fund accounts would then be made available by the benefit plan account or its plan sponsor to its participants, who could then choose one or more of the second plurality to use. Thus, a selection could be received directly or indirectly from one or more of the participants associated with the benefit plan account of at least one of the second plurality of loan fund accounts to invest loan fund assets of the one or more participants.

A further step or function in the operation is investing or having invested or maintaining loan fund assets comprising the participant assets associated with the selecting entity in the one or more respective different investment vehicles associated with the one or more loan fund accounts selected by the selecting entity. As noted, the selecting entity could be a record keeper, a benefit plan account, or one or more participants. In the case of a record keeper, the loan fund account would be funded with participant assets designated for the loan fund account in one or more benefit plans for which the one record keeper provides record keeping services that have been designated by participants for the loan fund account. In the case of a benefit plan account, the loan fund would be funded with participant assets from that benefit plan account that have been designated by participants for the loan fund account. Where the selecting entity is one or more participants, the loan fund account would be funded with designated assets from the one or more participants. This accumulation of participant assets would comprises the loan fund assets for providing loans. The investing operation is reflected in block 730 in FIG. 7.

The operation of block 730 could comprise a direct investment in the investment vehicle associated with the selected loan fund account. Alternatively, the operation could comprise providing instructions for the investment of the loan fund assets in the investment vehicle associated with the selected loan fund account. Alternatively, the operation could comprise the administration of the investment vehicle. The method of investing is not limiting on the invention. The operations could be performed electronically via electronic instructions and electronic deposit of funds to the particular investment vehicle, or it could be performed manually via paper transactions or a combination thereof.

A further step or function in the operation is associating a respective loan accounting process with each of the selected one or more loan fund accounts, that is capable of processing multiple loan requests for amounts that are less than an asset balance in the loan fund account, wherein the loan accounting process is different from one or more accounting processes associated with the respective one or more benefit plans. This operation is reflected in block 740 in FIG. 7. Such an accounting process may be implemented in the computer 606 and would encompass processing the individual debits and credits to be applied to the loan fund account so that the loan fund asset amount listed in the account information of the benefit plan account relating to the loan fund account does not change after each redemption. Note that this step may encompass a single instance of an accounting process performing the processing operations for all of the loan fund accounts, and also the association of a different instance of the accounting process to be associated with each different loan fund account.

Figure 7:
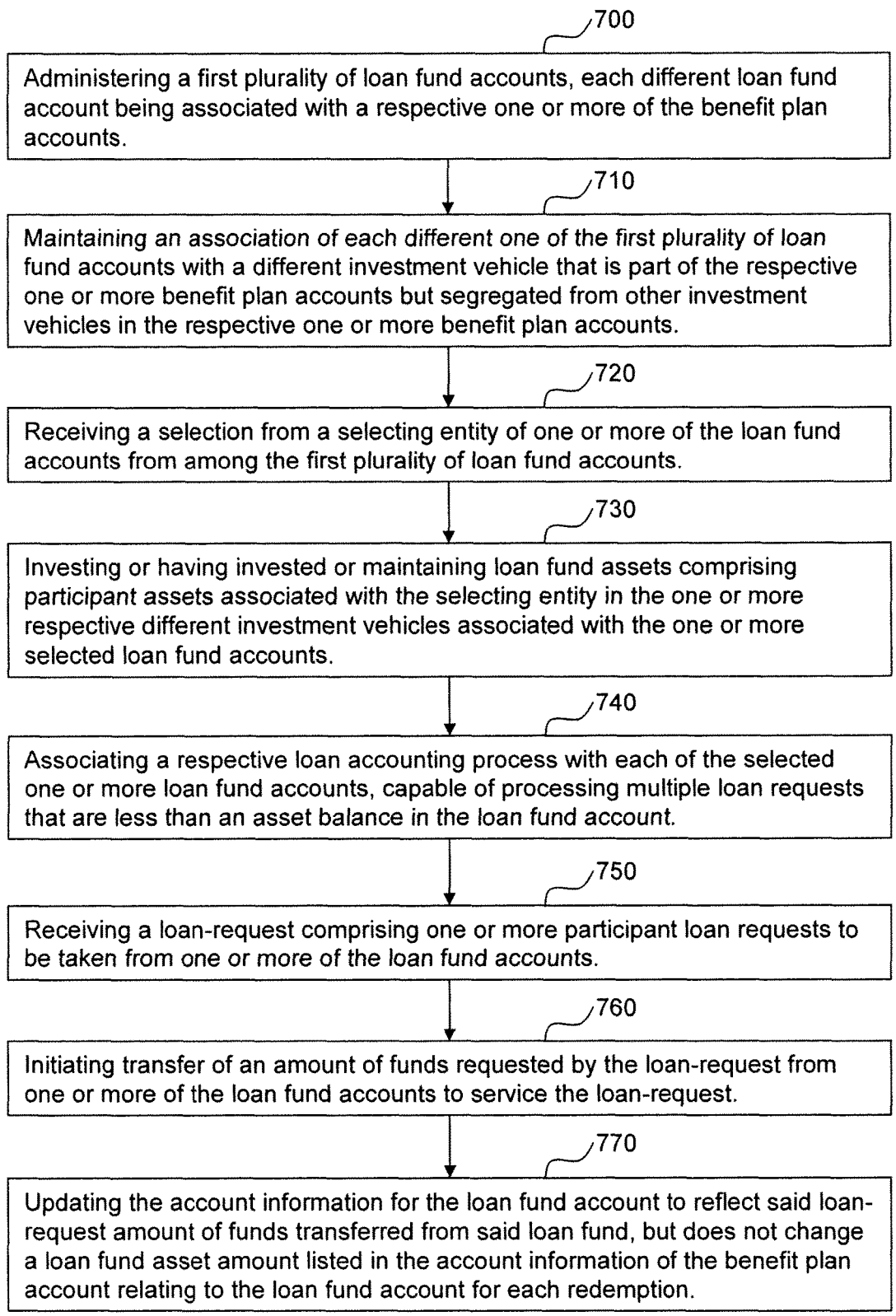
FIG. 7 is a schematic block diagram of a process and program code in accordance with an embodiment of the invention using multiple loan fund accounts.

A further step or function in the operation, as reflected in block 750 of FIG. 7, is receiving a loan-request comprising one or more participant loan requests to be taken from one or more of the loan fund accounts using account information for the loan fund account stored in a computer-readable memory accessible by the computer 606, the account information for the loan fund account being preferably stored by the computer system separately from account information for the benefit plan account. Note that the loan request may be from a single individual. Alternatively, the loan request may comprise an aggregation of loan fund account requests and credits from the various participants that have been aggregated by the computer 606 over a period of time, e.g., a four hour period, a 12 hour period, a one day period, for example.

A further step or operation might comprise comparing the amount of the loan-request to a current balance of available funds for the particular participant, and approving the loan-request if the amount requested is less than or equal to a current balance of available funds for the particular participant, and denying the loan-request if it is greater than the current balance of available funds.

A further step or operation comprises initiating transfer of an amount of funds requested by the loan-request from one or more of the loan fund accounts to service the loan-request. This operation is reflected in block 760 in FIG. 7. In one embodiment, this would comprise sending an electronic request to a holder of the funds for the loan fund account to initiate the transfer based on the amount in the loan request. In a different embodiment, this could be accomplished by a paper transaction. Note that in one embodiment an order of transfer could be designated by the participant or the benefit plan or service provider, so that funds are first transferred from a first designated loan fund up to a limit, and then from a second designated loan fund up to a limit, etc.

A further step or operation is provided of updating the account information for the loan fund account that may be separately stored from account information for the benefit plan account to reflect the loan-request amount of funds transferred from the loan fund account using the associated respective accounting process that computes a current balance of available funds in the loan fund account based on redemptions from and credits/payments to the amount of assets in the loan fund account, but does not change a loan fund asset amount listed in the account information of the benefit plan account relating to the loan fund account for every redemption. This operation is reflected in block 770 in FIG. 7. Note that on a periodic or other basis, the loan fund asset amount listed in the account information of the benefit plan account relating to the loan fund account may be changed to reflect additions to the loan fund account due to accumulated interest earnings, or due to the transfer of funds from the loan fund account to another investment vehicle in the benefit plan account not associated with the loan fund account.

In a further embodiment, each Record Keeper (Record Keeper A, Record Keeper B, etc.) has a separate account for a given Loan Fund Account, (for example, for loan fund account 1, Record Keeper A could have Loan Fund Account A1 and Record Keeper B could have Loan Fund Account B1, etc.). The individual plan participants funds could still be aggregated in each loan fund account, either aggregated by Benefit Plan Account and/or by Record Keeper.

From the above it can also be seen that in one embodiment, each of a plurality of benefit plan accounts may have selected a second plurality of loan fund accounts or for which a selection has been received on their behalf for a given second plurality of loan fund accounts. In this case, the assets designated for the loan fund accounts by participants of the respective benefit plan accounts are aggregated among the second loan fund accounts.

Additionally, it can also be seen that in a further embodiment, each of a plurality of record keepers may have selected a second plurality of loan fund accounts or for which a selection has been received on their behalf for a given second plurality of loan fund accounts. In this case, the assets designated for the loan fund accounts by participants associated with the respective record keepers are aggregated among the second loan fund accounts.

In a further embodiment, there are a plurality of the record keepers, and each different loan fund account is associated with one and only one record keeper.

In a yet further embodiment, there are a plurality of the record keepers, and each of the different record keepers has an associated separate account in each of a plurality of the loan fund accounts.

In a further embodiment, there are a plurality of the benefit plan accounts, and each different loan fund account is associated with one and only one benefit plan account.

In yet a further embodiment, there are a plurality of the benefit plan accounts, and each of the different benefit plan accounts has an associated separate account in each of a plurality of the loan fund account.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or manual operations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A loan management data processing computer system for interacting via respective communication interfaces for electronic communications with one or more record keeper computer systems associated with respective recorder keepers to administer loans to a plurality of participants of one or more employee benefit plans associated with one of the respective record keepers, said loan management data processing computer system comprising:
  one or more computers; and
  one or more computer-readable storage media operatively connected to one or more processors in the one or more computers, comprising computer program instructions configured for causing, when executed, the one or more computers to perform steps comprising:
  (A) accessing, by the one or more computers, in the performance of one or more of the following steps, one or more electronic databases comprising:
    (1) aggregated investment account information for a first plurality of aggregated investment accounts, each different aggregated investment account associated with a respective one or more of the employee benefit plans and comprising funds of a plurality of individual participant asset-funded loan fund accounts, each of the individual participant asset-funded loan fund accounts being associated with one or more of the employee benefit plans, each of the different aggregated investment accounts associated with a different one or more cash-equivalent investment vehicles;
    (2) participant asset-funded loan fund account information for a plurality of participants, the participant asset-funded loan fund account information for a respective participant of the plurality of participants comprising information indicating one or more participant asset-funded loan fund accounts each comprising a respective asset balance held in one or more of the aggregated investment accounts, wherein each participant asset-funded loan fund account is defined as an account which is separate from a respective core investment account of the respective participant's employee benefit plan account and is funded by assets segregated by the participant asset-funded loan fund account from the respective core investment account of the respective participant's employee benefit plan account, and wherein the participant asset-funded loan fund account information includes at least:
      (i) first participant asset-funded loan fund account information indicating a first participant asset-funded loan fund account (a) having a first account balance, (b) associated with a first aggregated investment account, (c) associated with a first individual participant associated with a first employee benefit plan account, and (d) funded by a first core investment account of the first employee benefit plan account, the first core investment account being associated with the first individual participant;
      (ii) second participant asset-funded loan fund account information indicating a second participant asset-funded loan fund account (a) having a second account balance, (b) associated with a second aggregated investment account, (c) associated with a second individual participant associated with the first employee benefit plan account, and (d) funded by a second core investment account of the first employee benefit plan account, the second core investment account being associated with the second individual participant; and
  (B) obtaining in real-time, by the one or more computers from a third individual participant associated with the first employee benefit plan, directly or through one of the one or more record keeper computer systems, selection information identifying a selection of the first aggregated investment account from among the first plurality of aggregated investment accounts by:
    (1) providing in real-time, via the respective communication interfaces for electronic communications, machine-readable instructions to a remote computing device associated with the third individual participant to render in real-time a loan selection graphical user interface, the loan selection graphical user interface comprising one or more selection options each corresponding to one of the first plurality of aggregated investment accounts; and (2) receiving in real-time, by the one or more computers via the respective communication interfaces for electronic communications, the selection of the first aggregated investment by the third individual participant through selecting a corresponding one of the selection options in the loan selection graphical user interface at the remote computing device;

(C) obtaining, by the one or more computers, an electronic indication of an initial amount of funds associated with the selection of the first aggregated investment account;

(D) creating and storing electronically, by the one or more computers based at least in part upon the selection information, third participant asset-funded loan fund account information comprising a third participant asset-funded loan fund account associated with the first aggregated investment account and further associated with the third individual participant by initializing, in the one or more electronic databases storing participant asset-funded loan fund account information, the third participant asset-funded loan fund account information;

(E) recording, by the one or more computers in the one or more electronic databases storing participant asset-funded loan fund account information, a third account balance from an electronic transfer of the initial amount of funds from a third core investment account of the first employee benefit plan account to the third participant asset-funded loan fund account, the third core investment account being associated with the third individual participant and the third account balance being associated with the third participant asset-funded loan fund account;

(F) associating electronically, by the one or more computers, a loan accounting process with the third participant asset-funded loan fund account for processing redemption data comprising one or more debits and repayment data comprising one or more credits, wherein the loan accounting process is different from one or more benefit accounting processes associated with the first employee benefit plan and wherein the loan accounting process comprises computing a balance of available funds in the third participant asset-funded loan fund account based at least in part upon the redemption data or the repayment data;

(G) for each of the individual participant asset-funded loan fund accounts of each individual participant that is electronically associated with one of the aggregated investment accounts, investing in the one aggregated investment account, by the one or more computers, funds of the respective individual participant asset-funded loan fund account with funds of other individual participant asset-funded loan fund accounts of other of the participants to form an aggregation of funds of the individual participant asset-funded loan fund accounts, wherein first funds of the first participant asset-funded loan fund account and third funds of the third participant asset-funded loan fund account are invested together in the first aggregated investment account;

(H) receiving, at the one or more computers, access vehicle redemption data associated with one or more access vehicles selected from the group of a check, a credit card, a debit card, an ACH transfer, a wire transfer, a sweep, and an ATM, for one or more redemptions for the third individual participant;

(I) generating, by the one or more computers, transfer data in response to receipt of the access vehicle redemption data for transferring one or more amounts of funds from the third participant asset-funded loan fund account to service the one or more redemptions; and (J) determining, by the one or more computers using the loan accounting process, for the third individual participant for which redemption data was received, an update of the third account balance for the third participant asset-funded loan fund account based at least in part on the transfer data and/or the redemption data associated with the third individual participant;

wherein the loan management data processing computer system interfaces with existing record keeper computer systems via respective communication interfaces to enable respective individual participants including the third individual participant to create, maintain, or manage respective loan fund accounts using assets from respective core investment accounts of an employee benefit plan and wherein respective funds of the respective loan fund accounts are invested in one or more respective aggregated investment accounts selected by the respective individual participants from the first plurality of aggregated investment accounts.

2. The computer system of claim 1, wherein the selection received from the one record keeper is for a second plurality of the aggregated investment accounts which second plurality is less than the first plurality, and wherein the computer system comprises a computer program instruction stored on the one or more computer-readable storage media for causing, when executed, the one or more computers to perform a step of receiving or obtaining from the record keeper computer system second selection information associated with a fourth individual participant associated with the record keeper computer system, the second selection information identifying a second selection from one of the participants associated with the one record keeper of at least one of a second plurality of aggregated investment accounts to invest loan fund assets associated with one or more individual participant asset-funded loan fund accounts associated with the fourth individual participant, wherein the second plurality of aggregated investment accounts is less than the first plurality of aggregated investment accounts.

3. The computer system of claim 1, wherein the computer system is further configured to interact via respective communication interfaces with one or more employee benefit plan computer systems associated with one or more employee benefit plans.

4. The computer system of claim 3, wherein the computer system comprises a computer program instruction stored on the one or more computer-readable storage media for causing, when executed, the one or more computers to perform a step of obtaining, from a first employee benefit plan computer system of the one of the one or more employee benefit plan computer systems, second selection information associated with a fourth individual participant associated with the first employee benefit plan, the second selection information identifying a second selection of at least one of a second plurality of aggregated investment accounts to invest loan fund assets associated with one or more individual participant asset-funded loan fund accounts associated with the fourth individual participant, wherein the second plurality of aggregated investment accounts is less than the first plurality of aggregated investment accounts.

5. The computer system of claim 3, wherein there are a plurality of different record keepers and a plurality of employee benefit plans and the computer system further comprising comprises:

a computer program instruction stored on the one or more computer-readable storage media for causing, when executed, the one or more computers to perform a step of obtaining a selection of a respective second plurality of the aggregated investment accounts from each respective record keeper computer system of the one or more record keeper computer systems, wherein one or more of the respective second pluralities are less than the first plurality; and a computer program instruction stored on the one or more computer-readable storage media for causing, when executed, the one or more computers to perform a step of facilitating funding the respective second plurality of the aggregated investment accounts selected by each different record keeper with participant assets associated with that respective record keeper.

6. The computer system of claim 1, wherein the loan management data processing computer system is further configured to interact via respective communication interfaces with at least some of the plurality of participants, and the computer system further comprises a computer program instruction stored on the one or more computer-readable storage media for causing, when executed, the one or more computers to perform a step of obtaining from one of the plurality of participants a selection of at least two of the first plurality of aggregated investment accounts.

7. The computer system of claim 1, wherein the selection information obtained is for a second plurality of aggregated investment accounts which second plurality is less than the first plurality, wherein there are a plurality of record keepers, and further comprising the computer system comprising a computer program instruction stored on the one or more computer-readable storage media for causing, when executed, the one or more computers to perform a step of facilitating distribution of the loan fund assets associated with the plurality of record keepers among the second plurality of aggregated investment accounts.

8. The computer system of claim 1, wherein there are a plurality of the record keepers, and the computer system further comprises a computer program instruction stored on the one or more computer-readable storage media for causing, when executed, the one or more computers to perform a step of maintaining each different aggregated investment account with one and only one record keeper.

9. The computer system of claim 1, wherein there are a plurality of the record keepers, and the computer system further comprises a computer program instruction stored on the one or more computer-readable storage media for causing, when executed, the one or more computers to perform a step of maintaining for each of the different record keepers a separate sub-account in each of a plurality of the aggregated investment accounts.

10. The computer system of claim 1, wherein there are a plurality of the employee benefit plans, and the computer system further comprises a computer program instruction stored on the one or more computer-readable storage media for causing, when executed, the one or more computers to perform a step of maintaining for each of the different employee benefit plans an associated separate sub-account in each of a plurality of the aggregated investment accounts.

11. The computer system of claim 1, further comprising computer code for accessing and communicating with a check clearinghouse network.

12. The system of claim 1, wherein the first core investment account, the second core investment account, and the third core investment account are the same account.

13. The system of claim 1, wherein the first core investment account and the second core investment account are the same account and the third core investment account is a different account.

14. The system of claim 1, wherein the first core investment account and the third core investment account are the same account and the second core investment account is a different account.

15. The system of claim 1, wherein the second core investment account and the third core investment account are the same account and the first core investment account is a different account.

16. A method for administering loans to a plurality of participants of one or more employee benefit plans associated with one or more record keepers by interacting via respective communication interfaces for electronic communications with one or more record keeper computer systems, comprising:

(A) accessing, by a loan management data processing computer system comprising one or more computers, in the performance of one or more of the following steps, one or more electronic databases comprising:

(1) aggregated investment account information for a first plurality of aggregated investment accounts, each different aggregated investment account associated with a respective one or more of the employee benefit plans and comprising funds of a plurality of individual participant asset-funded loan fund accounts, each of the individual participant asset-funded loan fund accounts being associated with one or more of the employee benefit plans, each of the different aggregated investment accounts associated with a different one or more cash-equivalent investment vehicles;

(2) participant asset-funded loan fund account information for a plurality of participants, the participant asset-funded loan fund account information for a respective participant of the plurality of participants comprising information indicating one or more participant asset-funded loan fund accounts each comprising a respective asset balance held in one or more of the aggregated investment accounts, wherein each participant asset-funded loan fund account is defined as an account which is separate from a respective core investment account of the respective participant's employee benefit plan account and is funded by assets segregated by the participant asset-funded loan fund account from the respective core investment account of the respective participant's employee benefit plan account, and wherein the participant asset-funded loan fund account information includes at least:

(i) first participant asset-funded loan fund account information indicating a first participant asset-funded loan fund account (a) having a first account balance, (b) associated with a first aggregated investment account, (c) associated with a first individual participant associated with a first employee benefit plan account, and (d) funded by a first core investment account of the first employee benefit plan account, the first core investment account being associated with the first individual participant;

(ii) second participant asset-funded loan fund account information indicating a second participant asset-funded loan fund account (a) having a second account balance, (b) associated with a second aggregated investment account, (c) associated with a second individual participant associated with the first employee benefit plan account, and (d) funded by a second core investment account of the first employee benefit plan account, the second core investment account being associated with the second individual participant; and (B) obtaining in real-time, by the one or more computers, from a third individual participant associated with the first employee benefit plan, directly or through one of the one or more record keeper computer systems, selection information identifying a selection of the first aggregated investment account from among the first plurality of aggregated investment accounts by:
  (1) providing in real-time, via the respective communication interfaces for electronic communications, machine-readable instructions to a remote computing device associated with the third individual participant to render in real-time a loan selection graphical user interface, the loan selection graphical user interface comprising one or more selection options each corresponding to one of the first plurality of aggregated investment accounts; and
  (2) receiving in real-time, by the one or more computers via the respective communication interfaces for electronic communications, the selection of the first aggregated investment by the third individual participant through selecting a corresponding one of the selection options in the loan selection graphical user interface at the remote computing device;

(C) obtaining, by the one or more computers, an electronic indication of an initial amount of funds associated with the selection of the first aggregated investment account;

(D) creating and storing electronically, by the one or more computers based at least in part upon the selection information, third participant asset-funded loan fund account information comprising a third participant asset-funded loan fund account associated with the first aggregated investment account and further associated with the third individual participant by initializing, in the one or more electronic databases storing participant asset-funded loan fund account information, the third participant asset-funded loan fund account information;

(E) recording, by the one or more computers in the one or more electronic databases storing participant asset-funded loan fund account information, a third account balance from an electronic transfer of the initial amount of funds from a third core investment account of the first employee benefit plan account to the third participant asset-funded loan fund account, the third core investment account being associated with the third individual participant and the third account balance being associated with the third participant asset-funded loan fund account;

(F) associating electronically, by the one or more computers, a loan accounting process with the third participant asset-funded loan fund account for processing redemption data comprising one or more debits and repayment data comprising one or more credits, wherein the loan accounting process is different from one or more benefit accounting processes associated with the first employee benefit plan and wherein the loan accounting process comprises computing a balance of available funds in the third participant asset-funded loan fund account based at least in part upon the redemption data or the repayment data;

(G) for each of the individual participant asset-funded loan fund accounts of each individual participant that is electronically associated with one of the aggregated investment accounts, investing in the one aggregated investment account, by the one or more computers, funds of the respective individual participant asset-funded loan fund account with funds of other individual participant asset-funded loan fund accounts of other of the participants to form an aggregation of funds of the individual participant asset-funded loan fund accounts, wherein first funds of the first participant asset-funded loan fund account and third funds of the third participant asset-funded loan fund account are invested together in the first aggregated investment account;

(H) receiving, at the one or more computers, access vehicle redemption data associated with one or more access vehicles selected from the group of a check, a credit card, a debit card, an ACH transfer, a wire transfer, a sweep, and an ATM, for one or more redemptions for the third individual participant;

(I) generating, by the one or more computers, transfer data in response to receipt of the access vehicle redemption data for transferring one or more amounts from the third participant asset-funded loan fund account to service the one or more redemptions; and (J) determining, by the one or more computers using the loan accounting process, for the third individual participant for which redemption data was received, an update of the third account balance for the third participant asset-funded loan fund account based at least in part on the transfer data and/or the redemption data associated with the third individual participant;

wherein the loan management data processing computer system interfaces with existing record keeper computer systems via respective communication interfaces to enable respective individual participants including the third individual participant to create, maintain, or manage respective loan fund accounts using assets from respective core investment accounts of an employee benefit plan and wherein respective funds of the respective loan fund accounts are invested in one or more respective aggregated investment accounts selected by the respective individual participants from the first plurality of aggregated investment accounts.

17. The method of claim 16, further comprising:
obtaining, from the record keeper computer system, second selection information associated with a fourth individual participant associated with the record keeper computer system, the second selection information identifying a second selection from one of the participants associated with the one record keeper of at least one of a second plurality of aggregated investment accounts to invest loan fund assets associated with one or more individual participant asset-funded loan fund accounts associated with the fourth individual participant, wherein the second plurality of aggregated investment accounts is less than the first plurality of aggregated investment accounts.

18. The method of claim 16, wherein the loan management data processing computer system is further configured to interact via respective communication interfaces with one or more employee benefit plan computer systems associated with one or more employee benefit plans.

19. The method of claim 18, further comprising:
obtaining, from a first employee benefit plan computer system of the one of the one or more employee benefit plan computer systems, second selection information associated with a fourth individual participant associated with the first employee benefit plan, the second selection information identifying a second selection of at least one of second plurality of aggregated investment accounts to invest loan fund assets associated with one or more individual participant asset-funded loan fund accounts associated with the fourth individual participant, wherein the second plurality of aggregated investment accounts is less than the first plurality of aggregated investment accounts.

20. The method of claim 18, wherein there are a plurality of different record keepers and a plurality of employee benefit plans and the method further comprises:
obtaining a selection of a respective second plurality of the aggregated investment accounts from each respective record keeper computer system of the one or more record keeper computer systems, wherein one or more of the respective second pluralities are less than the first plurality; and
facilitating funding, by the one or more computers, the respective second plurality of the aggregated investment accounts selected by each different record keeper with participant assets associated with that respective record keeper.

21. The method of claim 16, wherein the loan management data processing computer system is further configured to interact via respective communication interfaces with at least some of the plurality of participants, and the method further comprises obtaining, by the one or more computers from one of the plurality of participants a selection of at least two of the first plurality of aggregated investment accounts.

22. The method of claim 16, wherein the selection information obtained is for a second plurality of aggregated investment accounts which second plurality is less than the first plurality, wherein there are a plurality of record keepers, and further comprising facilitating distribution, by the one or more computers, of the loan fund assets associated with the plurality of record keepers among the second plurality of aggregated investment accounts.

23. The method of claim 16, wherein there are a plurality of the record keepers, and the method further comprises maintaining, by the one or more computers, each different aggregated investment account with one and only one record keeper.

24. The method of claim 16, wherein there are a plurality of the record keepers, and the method further comprises maintaining for each of the different record keepers, by the one or more computers, a separate sub-account in each of a plurality of the aggregated investment accounts.

25. The method of claim 16, wherein there are a plurality of the employee benefit plans, and the method further comprises maintaining for each of the different employee benefit plans, by the one or more computers, an associated separate sub-account in each of a plurality of the aggregated investment accounts.

26. The method of claim 16, further comprising accessing and communicating, by the one or more computers, with a check clearinghouse network.

27. The system of claim 16, wherein the first core investment account, the second core investment account, and the third core investment account are the same account.

28. The system of claim 16, wherein the first core investment account and the second core investment account are the same account and the third core investment account is a different account.

* * * * *